United States Patent
Rouland et al.

(10) Patent No.: US 7,913,303 B1
(45) Date of Patent: Mar. 22, 2011

(54) METHOD AND SYSTEM FOR DYNAMICALLY PROTECTING A COMPUTER SYSTEM FROM ATTACK

(75) Inventors: Christopher Jay Rouland, Atlanta, GA (US); Patrick Morton Becker, Doraville, GA (US); Christopher W. Klaus, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 2654 days.

(21) Appl. No.: 10/400,938

(22) Filed: Mar. 27, 2003

Related U.S. Application Data

(60) Provisional application No. 60/441,422, filed on Jan. 21, 2003.

(51) Int. Cl.
*G06F 11/30* (2006.01)
(52) U.S. Cl. .............................. 726/23; 726/22; 726/25
(58) Field of Classification Search .................. None
See application file for complete search history.

(56) References Cited

U.S. PATENT DOCUMENTS

| | | | |
|---|---|---|---|
| 4,223,380 A | 9/1980 | Antonaccio et al. |
| 4,400,769 A | 8/1983 | Kaneda et al. |
| 4,672,609 A | 6/1987 | Humphrey et al. |
| 4,773,028 A | 9/1988 | Tallman |
| 4,819,234 A | 4/1989 | Huber |
| 4,975,950 A | 12/1990 | Lentz |
| 5,032,979 A | 7/1991 | Hecht et al. |
| 5,121,345 A | 6/1992 | Lentz |
| 5,204,966 A | 4/1993 | Wittenberg et al. |
| 5,210,704 A | 5/1993 | Husseiny |
| 5,274,824 A | 12/1993 | Howarth |
| 5,278,901 A | 1/1994 | Shieh et al. |
| 5,309,562 A | 5/1994 | Li |
| 5,311,593 A | 5/1994 | Carmi |
| 5,345,595 A | 9/1994 | Johnson et al. |
| 5,347,450 A | 9/1994 | Nugent |
| 5,353,393 A | 10/1994 | Bennett et al. |
| 5,359,659 A | 10/1994 | Rosenthal |

(Continued)

FOREIGN PATENT DOCUMENTS

EP 0 636 977 5/2001

(Continued)

OTHER PUBLICATIONS

Essex, David, E-Sleuths Make Net Safe for E-Commerce, Computerworld, Jun. 2000, pp. 1-2.

(Continued)

*Primary Examiner* — Jung Kim
(74) *Attorney, Agent, or Firm* — King & Spalding, LLP

(57) ABSTRACT

A dynamic protection system can analyze a computer system to determine its vulnerabilities to attack and generate a policy for protecting the computer system based on the identified vulnerabilities. Data received by the computer system can be analyzed to determine if it poses a threat to the system. This can prevent the data from entering the system or host based on a determination that the data poses a threat. Also, the dynamic protection system can receive policy updates to allow it to protect the system more efficiently and effectively. In other words, the dynamic protection system can protect an evolving computer system operating in an environment that is characterized by constantly changing methods of attack. Furthermore, by minimizing a need for manual intervention, attacks can be rapidly and accurately detected with a minimization of false positives, thereby lowering the cost of operation.

58 Claims, 12 Drawing Sheets

U.S. PATENT DOCUMENTS

| | | |
|---|---|---|
| 5,371,852 A | 12/1994 | Attanasio et al. |
| 5,398,196 A | 3/1995 | Chambers |
| 5,414,833 A | 5/1995 | Hershey et al. |
| 5,440,723 A | 8/1995 | Arnold et al. |
| 5,452,442 A | 9/1995 | Kephart |
| 5,454,074 A | 9/1995 | Hartel et al. |
| 5,475,839 A | 12/1995 | Watson et al. |
| 5,511,184 A | 4/1996 | Lin |
| 5,515,508 A | 5/1996 | Pettus et al. |
| 5,522,026 A | 5/1996 | Records et al. |
| 5,539,659 A | 7/1996 | McKee et al. |
| 5,557,742 A | 9/1996 | Smaha et al. |
| 5,586,260 A | 12/1996 | Hu |
| 5,590,331 A | 12/1996 | Lewis et al. |
| 5,606,668 A | 2/1997 | Shwed |
| 5,623,600 A | 4/1997 | Ji et al. |
| 5,623,601 A | 4/1997 | Vu |
| 5,630,061 A | 5/1997 | Richter et al. |
| 5,649,095 A | 7/1997 | Cozza |
| 5,649,185 A | 7/1997 | Antognini et al. |
| 5,675,711 A | 10/1997 | Kephart et al. |
| 5,696,486 A | 12/1997 | Poliquin et al. |
| 5,696,822 A | 12/1997 | Nachenberg |
| 5,706,210 A | 1/1998 | Kumano et al. |
| 5,715,395 A | 2/1998 | Brabson et al. |
| 5,734,697 A | 3/1998 | Jabbarnezhad |
| 5,745,692 A | 4/1998 | Lohmann, II et al. |
| 5,748,098 A | 5/1998 | Grace |
| 5,761,504 A | 6/1998 | Corrigan et al. |
| 5,764,887 A | 6/1998 | Kells et al. |
| 5,764,890 A | 6/1998 | Glasser et al. |
| 5,765,030 A | 6/1998 | Nachenberg et al. |
| 5,774,727 A | 6/1998 | Walsh et al. |
| 5,787,177 A | 7/1998 | Leppek |
| 5,790,799 A | 8/1998 | Mogul |
| 5,796,942 A | 8/1998 | Esbensen |
| 5,798,706 A | 8/1998 | Kraemer et al. |
| 5,812,763 A | 9/1998 | Teng |
| 5,815,574 A | 9/1998 | Fortinsky |
| 5,822,517 A | 10/1998 | Dotan |
| 5,826,013 A | 10/1998 | Nachenberg |
| 5,828,833 A | 10/1998 | Belville et al. |
| 5,832,208 A | 11/1998 | Chen et al. |
| 5,832,211 A | 11/1998 | Blakley, III et al. |
| 5,835,726 A | 11/1998 | Shwed et al. |
| 5,838,903 A | 11/1998 | Blakely, III et al. |
| 5,842,002 A | 11/1998 | Schnurer et al. |
| 5,845,067 A | 12/1998 | Porter et al. |
| 5,848,233 A | 12/1998 | Radia et al. |
| 5,854,916 A | 12/1998 | Nachenberg |
| 5,857,191 A | 1/1999 | Blackwell, Jr. et al. |
| 5,864,665 A | 1/1999 | Tran |
| 5,864,803 A | 1/1999 | Nussbaum |
| 5,872,915 A | 2/1999 | Dykes et al. |
| 5,872,978 A | 2/1999 | Hoskins |
| 5,875,296 A | 2/1999 | Shi et al. |
| 5,878,420 A | 3/1999 | de la Salle |
| 5,881,236 A | 3/1999 | Dickey |
| 5,884,033 A | 3/1999 | Duvall et al. |
| 5,892,903 A | 4/1999 | Klaus |
| 5,899,999 A | 5/1999 | De Bonet |
| 5,905,859 A | 5/1999 | Holloway et al. |
| 5,907,834 A | 5/1999 | Kephart et al. |
| 5,919,257 A | 7/1999 | Trostle |
| 5,919,258 A | 7/1999 | Kayashima et al. |
| 5,922,051 A | 7/1999 | Sidey |
| 5,925,126 A | 7/1999 | Hsieh |
| 5,931,946 A | 8/1999 | Terada et al. |
| 5,940,591 A | 8/1999 | Boyle et al. |
| 5,950,012 A | 9/1999 | Shiell et al. |
| 5,961,644 A | 10/1999 | Kurtzberg et al. |
| 5,964,839 A | 10/1999 | Johnson et al. |
| 5,964,889 A | 10/1999 | Nachenberg |
| 5,974,237 A | 10/1999 | Shurmer et al. |
| 5,974,457 A | 10/1999 | Waclawsky et al. |
| 5,978,917 A | 11/1999 | Chi |
| 5,983,270 A | 11/1999 | Abraham et al. |
| 5,983,348 A | 11/1999 | Ji |
| 5,983,350 A | 11/1999 | Minear et al. |
| 5,987,606 A | 11/1999 | Cirasole et al. |
| 5,987,610 A | 11/1999 | Franczek et al. |
| 5,987,611 A | 11/1999 | Freund |
| 5,991,856 A | 11/1999 | Spilo et al. |
| 5,991,881 A | 11/1999 | Conklin et al. |
| 5,999,711 A | 12/1999 | Misra et al. |
| 5,999,723 A | 12/1999 | Nachenberg |
| 6,003,132 A | 12/1999 | Mann |
| 6,006,016 A | 12/1999 | Faigon et al. |
| 6,009,467 A | 12/1999 | Ratcliff et al. |
| 6,014,645 A | 1/2000 | Cunningham |
| 6,016,553 A | 1/2000 | Schneider et al. |
| 6,021,510 A | 2/2000 | Nachenberg |
| 6,026,442 A | 2/2000 | Lewis et al. |
| 6,029,256 A | 2/2000 | Kouznetsov |
| 6,035,323 A | 3/2000 | Narayen et al. |
| 6,035,423 A | 3/2000 | Hodges et al. |
| 6,041,347 A | 3/2000 | Harsham et al. |
| 6,052,709 A | 4/2000 | Paul |
| 6,061,795 A | 5/2000 | Dircks et al. |
| 6,067,410 A | 5/2000 | Nachenberg |
| 6,070,190 A | 5/2000 | Reps et al. |
| 6,070,244 A | 5/2000 | Orchier et al. |
| 6,073,172 A | 6/2000 | Frailong et al. |
| 6,081,894 A | 6/2000 | Mann |
| 6,085,224 A | 7/2000 | Wagner |
| 6,088,803 A | 7/2000 | Tso et al. |
| 6,088,804 A | 7/2000 | Hill et al. |
| 6,092,194 A | 7/2000 | Touboul |
| 6,094,731 A | 7/2000 | Waldin et al. |
| 6,098,173 A | 8/2000 | Elgressy et al. |
| 6,104,783 A | 8/2000 | DeFino |
| 6,108,799 A | 8/2000 | Boulay et al. |
| 6,118,940 A | 9/2000 | Alexander, III et al. |
| 6,119,165 A | 9/2000 | Li et al. |
| 6,119,234 A | 9/2000 | Aziz et al. |
| 6,122,738 A | 9/2000 | Millard |
| 6,144,961 A | 11/2000 | de la Salle |
| 6,154,844 A | 11/2000 | Touboul et al. |
| 6,161,109 A | 12/2000 | Matamoros et al. |
| 6,167,520 A | 12/2000 | Touboul |
| 6,173,413 B1 | 1/2001 | Slaughter et al. |
| 6,185,689 B1 | 2/2001 | Todd, Sr. et al. |
| 6,195,687 B1 | 2/2001 | Greaves et al. |
| 6,199,181 B1 | 3/2001 | Rechef et al. |
| 6,205,552 B1 | 3/2001 | Fudge |
| 6,220,768 B1 | 4/2001 | Barroux |
| 6,226,372 B1 | 5/2001 | Beebe et al. |
| 6,230,288 B1 | 5/2001 | Kuo et al. |
| 6,266,773 B1 | 7/2001 | Kisor et al. |
| 6,266,774 B1 | 7/2001 | Sampath et al. |
| 6,271,840 B1 | 8/2001 | Finseth et al. |
| 6,272,641 B1 | 8/2001 | Ji |
| 6,275,938 B1 | 8/2001 | Bond et al. |
| 6,275,942 B1 | 8/2001 | Bernhard et al. |
| 6,278,886 B1 | 8/2001 | Hwang |
| 6,279,113 B1 | 8/2001 | Vaidya |
| 6,282,546 B1 | 8/2001 | Gleichauf et al. |
| 6,298,445 B1 | 10/2001 | Shostack et al. |
| 6,301,668 B1 | 10/2001 | Gleichauf et al. |
| 6,314,520 B1 | 11/2001 | Schell et al. |
| 6,314,525 B1 | 11/2001 | Mahalingham et al. |
| 6,321,338 B1 | 11/2001 | Porras et al. |
| 6,324,627 B1 | 11/2001 | Kricheff et al. |
| 6,324,647 B1 | 11/2001 | Bowman-Amuah |
| 6,324,656 B1 | 11/2001 | Gleichauf et al. |
| 6,338,141 B1 | 1/2002 | Wells |
| 6,347,374 B1 | 2/2002 | Drake et al. |
| 6,353,385 B1 | 3/2002 | Molini et al. |
| 6,357,008 B1 | 3/2002 | Nachenberg |
| 6,377,994 B1 | 4/2002 | Ault et al. |
| 6,396,845 B1 | 5/2002 | Sugita |
| 6,397,242 B1 | 5/2002 | Devine et al. |
| 6,397,245 B1 | 5/2002 | Johnson, II et al. |
| 6,405,318 B1 | 6/2002 | Rowland |
| 6,405,364 B1 | 6/2002 | Bowman-Amuah |
| 6,408,391 B1 | 6/2002 | Huff et al. |
| 6,415,321 B1 | 7/2002 | Gleichauf et al. |

| | | |
|---|---|---|
| 6,429,952 B1 | 8/2002 | Olbricht |
| 6,434,615 B1 | 8/2002 | Dinh et al. |
| 6,438,600 B1 | 8/2002 | Greenfield et al. |
| 6,445,822 B1 | 9/2002 | Crill et al. |
| 6,453,345 B2 | 9/2002 | Trcka et al. |
| 6,453,346 B1 | 9/2002 | Garg et al. |
| 6,460,141 B1 | 10/2002 | Olden |
| 6,463,426 B1 | 10/2002 | Lipson et al. |
| 6,467,002 B1 | 10/2002 | Yang |
| 6,470,449 B1 | 10/2002 | Blandford |
| 6,477,585 B1 | 11/2002 | Cohen et al. |
| 6,477,648 B1 | 11/2002 | Schell et al. |
| 6,477,651 B1 | 11/2002 | Teal |
| 6,484,203 B1 | 11/2002 | Porras et al. |
| 6,487,666 B1 | 11/2002 | Shanklin et al. |
| 6,493,752 B1 | 12/2002 | Lee et al. |
| 6,496,858 B1 | 12/2002 | Frailong et al. |
| 6,499,107 B1 | 12/2002 | Gleichauf et al. |
| 6,510,523 B1 | 1/2003 | Perlman et al. |
| 6,517,587 B2 | 2/2003 | Satyavolu et al. |
| 6,519,647 B1 | 2/2003 | Howard et al. |
| 6,519,703 B1 | 2/2003 | Joyce |
| 6,530,024 B1 | 3/2003 | Proctor |
| 6,535,227 B1 | 3/2003 | Fox et al. |
| 6,546,493 B1 * | 4/2003 | Magdych et al. ............... 726/25 |
| 6,563,959 B1 | 5/2003 | Troyanker |
| 6,574,737 B1 | 6/2003 | Kingsford et al. |
| 6,578,147 B1 | 6/2003 | Shanklin et al. |
| 6,584,454 B1 | 6/2003 | Hummel, Jr. et al. |
| 6,601,190 B1 | 7/2003 | Meyer et al. |
| 6,606,744 B1 | 8/2003 | Mikurak |
| 6,618,501 B1 | 9/2003 | Osawa et al. |
| 6,628,824 B1 | 9/2003 | Belanger |
| 6,647,139 B1 | 11/2003 | Kunii et al. |
| 6,647,400 B1 | 11/2003 | Moran |
| 6,661,904 B1 | 12/2003 | Sasich et al. |
| 6,668,082 B1 | 12/2003 | Davison et al. |
| 6,668,084 B1 | 12/2003 | Minami |
| 6,681,331 B1 | 1/2004 | Munson et al. |
| 6,691,232 B1 | 2/2004 | Wood et al. |
| 6,704,874 B1 | 3/2004 | Porras et al. |
| 6,708,212 B2 | 3/2004 | Porras et al. |
| 6,711,127 B1 | 3/2004 | Gorman et al. |
| 6,711,615 B2 | 3/2004 | Porras et al. |
| 6,718,383 B1 | 4/2004 | Hebert |
| 6,721,806 B2 | 4/2004 | Boyd et al. |
| 6,725,377 B1 | 4/2004 | Kouznetsov |
| 6,725,378 B1 | 4/2004 | Schuba et al. |
| 6,775,780 B1 | 8/2004 | Muttik |
| 6,792,144 B1 | 9/2004 | Yan et al. |
| 6,792,546 B1 | 9/2004 | Shanklin et al. |
| 6,816,973 B1 | 11/2004 | Gleichauf et al. |
| 6,839,850 B1 | 1/2005 | Campbell et al. |
| 6,851,057 B1 | 2/2005 | Nachenberg |
| 6,871,284 B2 | 3/2005 | Cooper et al. |
| 6,886,102 B1 | 4/2005 | Lyle |
| 6,889,168 B2 | 5/2005 | Hartley et al. |
| 6,912,676 B1 | 6/2005 | Gusler et al. |
| 6,988,208 B2 * | 1/2006 | Hrabik et al. ................... 726/23 |
| 7,058,821 B1 * | 6/2006 | Parekh et al. ................. 713/194 |
| 7,076,803 B2 * | 7/2006 | Bruton et al. ................... 726/23 |
| 7,095,759 B1 * | 8/2006 | Fitzgerald ..................... 370/538 |
| 7,331,061 B1 * | 2/2008 | Ramsey et al. ................. 726/23 |
| 7,424,744 B1 * | 9/2008 | Wu et al. ......................... 726/23 |
| 2001/0034847 A1 | 10/2001 | Gaul, Jr. |
| 2002/0032717 A1 | 3/2002 | Malan et al. |
| 2002/0032793 A1 | 3/2002 | Malan et al. |
| 2002/0032880 A1 | 3/2002 | Poletto et al. |
| 2002/0035698 A1 | 3/2002 | Malan et al. |
| 2002/0083331 A1 | 6/2002 | Krumel |
| 2002/0083334 A1 | 6/2002 | Rogers et al. |
| 2002/0138753 A1 | 9/2002 | Munson |
| 2002/0144156 A1 | 10/2002 | Copeland, III |
| 2003/0037136 A1 | 2/2003 | Labovitz et al. |
| 2003/0088791 A1 | 5/2003 | Porras et al. |
| 2003/0212903 A1 | 11/2003 | Porras et al. |
| 2004/0010718 A1 | 1/2004 | Porras et al. |
| 2004/0103314 A1 * | 5/2004 | Liston ........................... 713/201 |

FOREIGN PATENT DOCUMENTS

| | | |
|---|---|---|
| EP | 0 985 995 | 8/2003 |
| WO | WO 93/25024 | 12/1993 |
| WO | WO 98/41919 | 9/1998 |
| WO | WO 99/00720 | 1/1999 |
| WO | WO 99/13427 | 3/1999 |
| WO | WO 99/15966 | 4/1999 |
| WO | WO 99/50734 | 10/1999 |
| WO | WO 99/53391 | 10/1999 |
| WO | WO 99/57626 | 11/1999 |
| WO | WO 00/02115 | 1/2000 |
| WO | WO 00/10278 | 2/2000 |
| WO | WO 00/25214 | 5/2000 |
| WO | WO 00/25527 | 5/2000 |
| WO | WO 00/34867 | 6/2000 |
| WO | WO 00/54458 | 9/2000 |
| WO | WO 01/84285 | 11/2001 |
| WO | WO 02/06928 | 1/2002 |
| WO | WO 02/056152 | 7/2002 |
| WO | WO 02/101516 | 12/2002 |

OTHER PUBLICATIONS

Newman, David, Intrusion Detection Systems, Data Communications, 1998, pp. 1-9.

International Search Report for PCT/US02/17161 of Dec. 31, 2002.

Hyland, et al., Concentric Supervision of Security Applications: A New Security Management Paradigm Computer Security Applications Conference, 1998, pp. 59-68.

Koilpillai et al., Recon-A Tool for Incident Detection, Tracking and Response, Darpa Information Survivability Conference and Exposition, 2000, pp. 199-206.

Alves-Foss, J., An Overview of SNIF: A Tool for Surveying Network Information Flow, Network and Distributed System Security, 1995, pp. 94-101.

Mansouri-Samani et al., A Configurable Event Service for Distributed Systems Configurable Distributed Systems, 1996, pp. 210-217.

International Search Report for PCT/US01/13769 of Mar. 8, 2002.

Jagannathan et al., System Design Document: Next-Generation Intrusion Detection Expert Systems (NIDES), Internet Citation, Mar. 9, 1993, XP002136082, pp. 1-66.

Koilpillai, Adaptive Network Security Management, DARPA NGI PI Conference, Oct. 1998, pp. 1-27.

Hiverworld Continuous Adaptive Risk Management, Hiverworld, Inc., 1999-2000, pp. 1-14.

International Search Report for PCT/US02/04989of Sep. 19, 2002.

International Search Report for PCT/US02/02917 of Aug. 8, 2002.

International Search Report for PCT/US03/00155 of May 15, 2003.

NXI Communications, Inc., White Paper, NTS Security Issues, Oct. 15, 2001, pp. 1-12.

Mounji et al., Distributed Audit Trail Analysis, Proceedings of the Symposium of Network and Distributed System Security, San Diego, CA, Feb. 16-17, 1995, pp. 102-112.

Wobber et al., Authentication in the Taos Operating System, ACM Transactions on Computer Systems, vol. 12, No. 1, Feb. 1994, pp. 3-32.

Mayer et al., The Design of the Trusted Workstation: A True Infosec Product, 13th National Computer Security Conference, Washing, DC, Oct. 1-4, 1990, pp. 827-839.

Dawson, Intrusion Protection for Networks, Byte, Apr. 1995, pp. 171-172.

Buhkan, Checkpoint Charlie, PC Week Network, Nov. 27, 1995, pp. N1, N6-N7.

Process Software Technical Support Page, found on http://www.process.com/techsupport/whitesec.html, printed off of the Process Software website on Feb. 26, 2003, pp. 1-5.

Ganesan, BAfirewall: A Modern Firewall Design, Proceedings Internet Society Symposium on Network and Distributed System Security 1994, Internet Soc., 1994, pp. 99-108.

Lee, Trusted Systems, Chapter II-1-6 of Handbook of Information Security Management, Ed. Zella G. Ruthberg and Harold F. Tipton, Auerbach, Boston and New York, 1993, pp. 345-362.

Lunt, Automated Intrusion Detection, Chapter II-4-4 of Handbook of Information Security Management, Ed. Zella G. Ruthberg and Harold F. Tipton, Auerbach, Boston and New York, 1993, pp. 551-563.

Guha et al., Network Security via Reverse Engineering of TCP Code: Vulnerability Analysis and Proposed Solution, IEEE, Mar. 1996, pp. 603-610.

Garg et al., High Level Communication Primitives for Concurrent Systems, IEEE, 1988, pp. 92-99.

Hastings et al., TCP/IP Spoofing Fundamentals, IEEE, May 1996, pp. 218-224.

Snapp, Signature Analysis and Communication Issues in a Distributed Intrusion Detection System, Master Thesis, University of California, Davis, California, 1991, pp. 1-40.

Guha et al., Network Security via Reverse Engineering of TCP Code: Vulnerability Analysis and Proposed Solutions, IEEE, Jul. 1997, pp. 40-48.

Djahandari et al., An MBone for an Application Gateway Firewall, IEEE, Nov. 1997, pp. 72-81.

Kim et al., Implementing a Secure Login Environment: A Case Study of Using a Secure Network Layer Protocol, Department of Computer Science, University of Alabama, Jun. 1995, pp. 1-9.

Satyanarayanan, Integrating Security in a Large Distributed System, Acm Transaction on Computer Systems, vol. 7, No. 3, Aug. 1989, pp. 47-280.

Sammons, Nathaniel, "Multi-platform Interrogation and Reporting with Rscan," The Ninth Systems Administration Conference, LISA 1995, Monterrey, California, Sep. 17-22, 1995, pp. 75-87.

Dean et al., "Java Security: From HotJava to Netscape and Beyond," Proceedings of the 1996 IEEE Symposium on Security and Privacy, May 6-8, 1996, Oakland, California, pp. 190-200.

Fisch et al., "The Design of an Audit Trail Analysis Tool," Proceedings of the 10th Annual Computer Security Applications Conference, Dec. 5-9, 1994, Orlando, Florida, pp. 126-132.

Safford et al., "The TAMU Security Package: An Ongoing Response to Internet Intruders in an Academic Environment," USENIX Symposium Proceedings, UNIX Security IV, Oct. 4-6, 1993, Santa Clara, California, pp. 91-118.

Sugawara, Toshiharu, "A Cooperative LAN Diagnostic and Observation Expert System," Ninth Annual Phoenix Conference on Computers and Communications, 1990 Conference Proceedings, Mar. 21-23, 1990, Scottsdale, Arizona, pp. 667-674.

Casella, Karen A., "Security Administration in an Open Networking Environment," The Ninth Systems Administration Conference, LISA 1995, Monterrey, California, Sep. 17-22, 1995, pp. 67-73.

Burchell, Jonathan, "Vi-SPY: Universal NIM?" Virus Bulletin, Jan. 1995, pp. 20-22.

Benzel et al., "Identification of Subjects and Objects in a Trusted Extensible Client Server Architecture," 18th National Information Systems Security Conference, Oct. 10-13, 1995, Baltimore, Maryland, pp. 83-99.

Epstein et al., "Component Architectures for Trusted Netware," 18th National Information Systems Security Conference, Oct. 10-13, 1995, Baltimore, Maryland, pp. 455-463.

Varadharajan, Vijay, "Design and Management of a Secure Networked Administration System: A Practical Approach," 19th National Information Systems Security Conference, Oct. 22-25, 1996, Baltimore, Maryland, pp. 570-580.

Snapp et al., "DIDS (Distributed Intrusion Detection System)—Motivation, Architecture, and An Early Prototype," 14th National Computer Security Conference, Oct. 1-4, 1991, Washington, DC, pp. 167-176.

Broner et al., "Intelligent I/O Rule-Based Input/Output Processing for Operating Systems," Operating Systems Review, vol. 25, No. 3, Jul. 1991, pp. 10-26.

Drews et al., "Special Delivery—Automatic Software Distribution Can Make You A Hero," Network Computing, Aug. 1, 1994, pp. 80, 82-86, 89, 91-95.

Morrissey, Peter, "Walls," Network Computing, Feb. 15, 1996, pp. 55-59, 65-67.

Harlander, Dr. Magnus, "Central System Administration in a Heterogenous Unix Environment: GeNUAdmin," Proceedings of the Eighth Systems Administration Conference (LISA VIII), Sep. 19-23, 1994, San Diego, California, pp. 1-8.

Shaddock et al., "How to Upgrade 1500 Workstations on Saturday, and Still Have Time to Mow the Yard on Sunday," The Ninth Systems Administration Conference LISA '95, Sep. 17-22, 1995, Monterrey, California, pp. 59-65.

Anderson, Paul, "Towards a High-Level Machine Configuration System," Proceedings of the Eighth Systems Administration Conference (LISA VIII), Sep. 19-23, 1994, San Diego, California, pp. 19-26.

Cooper, Michael A., "Overhauling Rdist for the '90s," Proceedings of the Sixth Systems Administration Conference (LISA VI), Oct. 19-23, 1992, Long Beach, California, pp. 175-188.

Vangala et al., "Software Distribution and Management in a Networked Environment," Proceedings of the Sixth Systems Administration Conference, Oct. 19-23, 1992, Long Beach, California, pp. 163-170.

Kim et al., "The Design and Implementation of Tripwire: A File System Integrity Checker," 2nd ACM Conference on Computer and Communications Security, Nov. 2-4, 1994, Fairfax, Virginia, pp. 18-29.

Winn Schwartau, "e.Security™-Solving 'Dumb Days' With Security Visualization," e-Security, Inc., Naples, FL 34103, 2000.

Anita D'Amico, Ph.D., "Assessment of Open e-Security Platform™: Vendor-Independent Central Management of Computer Security Resources," Applied Visions, Inc., 1999.

"e.Security™-Open Enterprise Security Management Delivering an integrated, automated, centrally Managed Solution You Can Leverage Today and Tomorrow," e-Security, Inc., Naples, FL 34102, 1999.

"e.Security™-Vision," e-Security, Inc., Naples, FL, 1999.

"e.Security™-Administrator Workbench™," e-Security, Inc. Naples, FL, 1999.

"e.Security™-Fact Sheet," e-Security, Inc., Naples, FL, 1999.

"e.Security™-Open e-Security Platform™," e-Security, Inc. Naples, FL, 1999.

Babcock, "E-Security Tackles The Enterprise," Jul. 28, 1999; Inter@ctive Week, www.Zdnet.com.

Kay Blough, "In Search of More-Secure Extranets," Nov. 1, 1999, www.InformationWeek.com.

Paul H. Desmond, "Making Sense of Your Security Tools," Software Magazine and Wiesner Publishing, www.softwaremag.com, 1999.

Kay Blough, "Extra Steps Can Protect Extranets," Nov. 1, 1999, www. InformationWeek.com.

Sean Hao, "Software protects e-commerce—e-Security's product alerts networks when hackers attack," Florida Today, Florida.

Scott Weiss, "Security Strategies—E-Security, Inc.," product brief, Hurwitz Group, Inc., Mar. 24, 2000.

Sean Adee, CISA, "Managed Risk, Enhanced Response—The Positive Impact of Real-Time Security Awareness," Information Systems Control Journal, vol. 2, 2000.

"Reprint Review—The Information Security Portal—Open e-Security Platform Version 1.0", Feb. 2000, West Coast Publishing, SC Magazine, 1999.

"e.Security—Introducing the First Integrated, Automated, and Centralized Enterprise Security Management System," white paper, e-Security, Inc., Naples, FL 34102, 1999.

Ann Harrison, "Computerworld—Integrated Security Helps Zap Bugs," Feb. 21, 2000, Computerworld, vol. 34, No. 8, Framingham, MA.

Shruti Daté, "Justice Department Will Centrally Monitor Its Systems For Intrusions," Apr. 3, 2000, Post-Newsweek Business Information, Inc., www.gcn.com.

e.Security™, website pages (pp. 1-83), www.esecurityinc.com, e-Security, Inc., Naples, FL 34103, Sep. 14, 2000.

Peter Sommer, "Intrusion Detection Systems as Evidence," Computer Security Research Centre, United Kingdom.

Musman et al., System or Security Managers Adaptive Response Tool, DARPA Information Survivability Conference and Exposition, Jan. 25, 2000, pp. 56-68.

Gibson Research Corporation Web Pages, Shields Up!—Internet Connection Security Analysis, grc.com/default.htm, Laguna Hills, California, 2000.

Rouse et al., Design and Evaluation of an Onboard Computer-Based Information System fro Aircraft, IEEE Transactions of Systems, Man, and Cybernetics, vol. SMC-12, No. 4, Jul./Aug. 1982, pp. 451-463.

Hammer, An Intelligent Flight-Management Aid for Procedure Execution, IEEE Transactions on Systems, Man, and Cybernetics, vol. SMC-14, No. 6, Nov./Dec. 1984, pp. 885-888.

Mann et al., Analysis of User Procedural Compliance in Controlling a Simulated Process, IEEE Transactions on Systems, Man, and Cybernetics, vol. SMC-16, No. 4, Jul./Aug. 1986.

Todd, Signed and Delivered: An Introduction to Security and Authentication, Find Out How the Jave Security API Can Help you Secure your Code, Javaworld, Web Publishing, Inc., San Francisco, Dec. 1, 1998, pp. 1-5.

Arvind, Secure This. Inform, Association for Information and Image Management, Silver Spring, Sep./Oct. 1999, pp. 1-4.

Stevens, TCP/IP Illustrated, vol. 1, 1994, pp. 247.

Lee et al., A Generic Virus Detection Agent on the Internet, IEEE, 30$^{th}$ Annual Hawaii International Conference on System Sciences, 1997, vol. 4.

Cutler, Inside Windows NT, 1993, Microsoft Press.

Duncan, Advanced MS-Dos, 1986, Microsoft Press.

McDaniel, IBM Dictionary of Computing, 1994, International Business Machines Corporation.

Burd, Systems Architecture, 1998, Course Technology, Second Edition.

Programmer's Guide PowerJ, 1997, Sybase.

Swimmer et al., Dynamic detection and classification of computer viruses using general behavior patterns, 1995, Proceedings of the Fifth International Virus Bulletin Conference, Boston.

Advanced Virus Detection Technology for the Next Millennium, Aug. 1999, Network Associates, A Network Associates Executive White Paper, pp. 1-14.

Enterprise-Grade Anti-Virus Automation in the 21$^{st}$ Century, Jun. 2000, Symantec, Technology Brief, pp. 1-17.

Kephart et al., Blueprint for a Computer Immune System, 1997, Retrieved from Internet, URL: http//www.research.ibm.com/antivirus/scipapers/kephart/VB97, pp. 1-15.

Richardson, Enterprise Antivirus Software, Feb. 2000, Retrieved from Internet, URL: http://www.networkmagazine.com/article/nmg20000426S0006, pp. 1-6.

Understanding and Managing Polymorphic Viruses, 1996, Symantec, The Symantec Enterprise Papers, vol. XXX, pp. 1-13.

Gong, JavaTM Security Architecture (JDK1.2), Oct. 2, 1998, Sun Microsystems, Inc., Version 1.0, pp. i-iv, 1-62.

Softworks Limited VBVM Whitepaper, Nov. 3, 1998, Retrieved from the Internet, URL: http://web.archive.org/web/19981203105455/http://softworksltd.com/vbvm.html, pp. 1-4.

Kephart, A Biologically Inspired Immune System for Computers, 1994, Artificial Life IV, pp. 130-139.

International Search Report for PCT/US01/26804 of Mar. 21, 2002.

Kosoresow et al., Intrusion Detection via System Call Traces, IEEE Software, pp. 35-42, Sep./Oct. 1997.

Veldman, Heuristic Anti-Virus Technology, Proceedings, 3$^{rd}$ International Virus Bulletin Conference, pp. 67-76, Sep. 1993.

Symantec, Understanding Heuristics: Symantec's Bloodhound Technology, Symantec White Paper Series, vol. XXXIV, pp. 1-14, Sep. 1997.

Nachenberg, A New Technique for Detecting Polymorphic Computer Viruses, A thesis submitted in partial satisfaction of the requirements for the degree Master of Science in Computer Science, University of California Los Angeles, pp. 1-127, 1995.

Microsoft P-Code Technology, http://msdn.microsoft.com/archive/default.asp?url=/archive/en-us/dnarvc/html/msdn_c7pcode2.asp, pp. 1-6, Apr. 1992.

DJGPP COFF Spec, http://delorie.com/djgpp/doc/coff/, pp. 1-15, Oct. 1996.

Natvig, Sandbox Technology Inside AV Scanners, Virus Bulletin Conference, Sep. 2001, pp. 475-488.

Norman introduces a new technique for eliminating new computer viruses, found on Norman's website, file://c:/documents%20and%20settings\7489\local%20settings\temporary%20internet%20files\olk, pp. 1-2, published Oct. 25, 2001, printed from website Dec. 27, 2002.

International Search Report for PCT/US01/19142 of Jan. 17, 2003.

Using the CamNet BBS FAQ, http://www.cam.net.uk/manuals/bbsfaq/bbsfaq.htm, Jan. 17, 1997.

Express Storehouse Ordering System, "Accessing ESOS through the Network", http://www-bfs.ucsd.edu/mss/esos/man3.htm, Sep. 3, 1996.

NASIRE, NASIRC Bulletin #94-10, http://cs-www.ncsl.nist.gov/secalert/nasa/nasa9410.txt, Mar. 29, 1994.

Packages in the net directory, http://linux4u.jinr.ru/usoft/WWW/www_debian.org/FTP/net.html, Mar. 20, 1997.

Sundaram, An Introduction to Intrusion Detection, Copyright 1996, published at www.acm.org/crossroads/xrds2-4/intrus.html, pp. 1-12.

Samfat, IDAMN: An Intrusion Detection Architecture for Mobile Networks, IEEE Journal on Selected Areas in Communications, vol. 15, No. 7, Sep. 1997, pp. 1373-1380.

INFO: Visual Basic Supports P-Code and Native Code Compilation (Q229415), http://support.micorsoft.com/support/kb/articles/Q229/4/15.ASP, pp. 1-2, Apr. 28, 1999.

International Search Report for PCT/US99/29117 of May 2, 2000.

Nordin, U of MN OIT Security and Assurance, Feb. 9, 2000.

Internet Security Systems, RealSecure SiteProtector, SAFEsuite Decisions to SiteProtector Migration, Aug. 8, 2003, pp. 1-42.

Internet Security Systems, SAFEsuite Enterprise, SAFEsuite Decisions, 1998.

Internet Security Systems, SAFEsuite Enterprise, Recognizing the Need for Enterprise Security: An Introduction to SAFEsuite Decisions, Aug. 1998, pp. 1-9.

Internet Security Systems, SAFEsuite Decisions 2.6, Frequently Asked Questions, Feb. 21, 2001, pp. 1-10.

Internet Security Systems, SAFEsuite Decisions Version 1.0, User's Guide, 1998, pp. 1-78.

Porras et al., Emerald: Event Monitoring Enabling Responses to Anomalous Live Disturbances, Computer Science Laboratory, SRI International, Menlo Park, CA, Oct. 1997, pp. 353-365.

Cisco Systems, Empowering the Internet Generation, 1998.

Messmer, Start-Up Puts Hackers on BlackICE, Network World Fusion, http://www.nwfusion.com/cgi-bin/mailto/x/cgi, Apr. 21, 1999, p. 1-2.

NeworkICE Corporation, Can You Explain How Your Product Can Protect a Remote User with a VPN Client?, 1998-1999, pp. 1-2, http://www.webarchive.org/web/20000304071415/advice.networkice.com/advice/support/kb/q000003/default.

Yasin, Start-Up Puts Network Intruders on Ice, http://www.internetweek.com/story/INW19990505S0001, May 5, 1999, pp. 1-2.

Morency, NetworkWorldFusion, http://nwfusion.com/cgi-bin/mailto/x.cgi, Jun. 28, 1999, pp. 1-2.

Rogers, Network ICE Touts Security Wares, Apr. 23, 1999, San Mateo, California, http://www.crn.com/showArticle.jhtml?articleID=18829106&flatPage=true, pp. 1-2.

Rogers, Network ICE Signs Resellers, May 26, 1999, San Mateo, California, http://www.crn.com/showArticle.jhtml?articleID=18805302&flatPage=true, pp. 1-2.

Internet Security Systems, I've Been Attacked! Now What?, Aug. 27, 1999, http://www.iss.net/security_center/advice/Support/KB/q000033/default.htm, pp. 1-2.

Internet Security Systems, What is the Format of "Attack-List.CSV"?, Aug. 21, 1999, http://www.iss.net/security_center/advice/Support/KB/q000018/default.htm, pp. 1-2.

Neumann et al., Experience with Emerald to Date, Apr. 11-12, 1999, 1$^{st}$ USENIX Workshop on Intrusion Detection and Network Monitoring, Santa Clara, California, pp. 1-9.

Lindqvist et al., Detecting Computer and Network Misuse Through the Production-Based Expert System Toolset (P-BEST), May 9-12, 1999, Proceedings of the 1999 IEEE Symposium on Security and Privacy, Oakland, California, pp. 1-16.

Kendall, A Database of Computer Attacks for the Evaluation of Intrusion Detection Systems, Jun. 1999, Department of Defense Advanced Research Projects Agency, pp. 1-124.

Neumann, Computer Security and the U.S. Infrastructure, Nov. 6, 1997, Congressional Testimony, pp. 1-11.

Porras et al., Life Traffic Analysis of TCP/IP Gateways, Nov. 10, 1997, Internet Society's Networks and Distributed Systems Security Systems Symposium, Mar. 1998, http://www.sdl.sri.com/projects/emerald/live-traffic.html, pp. 1-16.

Raynaud et al., Integrated Network Management IV, 1995, Proceedings of the 4th International Symposium on Integrated Network Management, pp. 1-2 and 5-16.

Heberlein et al., A Method to Detect Intrusive Activity in a Networked Environment, Oct. 1-4, 1991, 14th National Computer Security Conference, Washington, D.C., pp. 362-363 and 365-371.

Ko et al., Execution Monitoring of Security-Critical Programs in Distributed Systems: A Specification-Based Approach, 1997, Proceedings of the 1997 IEEE Symposium on Security and Privacy, pp. 175-187.

Crosbie et al., Active Defense of a Computer System Using Autonomous Agents, Technical Report No. 95-008, Feb. 15, 1995, Purdue University, West Lafayette, Indiana, pp. 1-14.

Mansouri-Samani et al., Monitoring Distributed Systems, Nov. 1993, IEEE Network, pp. 20-30.

Jakobson et al., Alarm Correlation, Nov. 1993, IEEE Network, pp. 52-59.

Anderson et al., Next-Generation Intrusion Detection Expert (NIDES), A Summary, May 1995, SRI International, pp. 1-37.

Veritas Software, Press Release, Robust Enhancements in Version 6.0 Maintain Seagate WI as the De Facto Standard for Software Distribution, Oct. 6, 1997, Press Releases, pp. 1-4, http://216.239.39.104/search?q=cache:HS9kmK1m2QoJ:www.veritas.com/us/aboutus/pressroom/199....

Yasin, Network-Based IDS are About to Stop Crying Wolf, Security Mandate: Silence False Alarms, Apr. 9, 1999, http://lists.jammed.com/ISN/1999/04/0021.html, pp. 1-3.

Internet Security Systems, Press Release, ISS Reports Record Revenues and Net Income for Second Quarter, Jul. 19, 1999, http://bvlive01.iss.net/issEn/delivery/prdetail.jsp?type=Financial&oid=14515, pp. 1-5.

LaPadula, State of the Art in CyberSecurity Monitoring, A Supplement, Sep. 2001, Mitre Corporation, pp. 1-15.

Balasubramaniyan et al., An Architecture for Intrusion Detection Using Autonomous Agents, Jun. 11, 1998, Purdue University, West Lafayette, Indiana, pp. 1-4, http://gunther.smeal.psu.edu/images/b9/f3/bb/9e/ba7f39c387.1dcedeb9abd0f70cb84607/1.png.

Crosbie et al., Active Defense of a Computer System Using Autonomous Agents, Feb. 15, 1995, Technical Report No. 95-008, Purdue University, West Lafayette, Indiana, pp. 1-14.

Crosbie et al., Defending a Computer System Using Autonomous Agents, Mar. 11, 1994, Technical Report No. 95-022, Purdue University, West Lafayette, Indiana, pp. 1-11.

Denning, An Intrusion-Detection Model, Feb. 1987, IEEE Transactions on Software Engineering, vol. SE-13, No. 2, pp. 1-17.

Lunt, A Survey of Intrusion Detection Techniques, 1993, Computers & Security, 12 (1993), pp. 405-418.

Porras et al., Penetration State Transition Analysis A Rule-Based Intrusion Detection Approach, 1992, pp. 220-229.

Javitz et al., The NIDES Statistical Component: Description and Justification, SRI International, Menlo Park, California, SRI Project 3131, Mar. 7, 1994.

Lindqvist et al., Detecting Computer and Network Misuses Through the Production-Based Expert System Toolset (P-BEST), Oct. 25, 1998, pp. 1-20.

Javitz et al., The SRI IDES Statistical Anomaly Detector, SRI Internationa, Menlo Park, California, May 1991, IEEE Symposium on Security and Privacy, pp. 1-11.

Porras et al., Live Traffic Analysis of TCP/IP Gateways, Nov. 10, 1997, SRI International, Menlo Park, California, pp. 1-16.

Porras et al., Live Traffic Analysis of TCP/IP Gateways, Dec. 12, 1997, SRI International, Menlo Park, California, Proceedings of the 1998 ISOC Symposium on Network and Distributed Systems Security, pp. 1-13.

Information & Computing Sciences: System Design Laboratory: Programs: Intrusion Detection, SRI International, http://www.sdl.sri.com/programs/intrusion/, Jun. 17, 2004, pp. 1-2.

Lindqvist et al., eXpert-BSM: A Host-based Intrusion Detection Solution for Sun Solaris, SRI International, Menlo Park, California, Dec. 10-14, 2001, Proceedings of the 17th Annual Computer Security Applications Conference, pp. 1-12.

Almgren et al., Application-Integrated Data Collection for Security Monitoring, Oct. 10-12, 2001, SRI International, Menlo Park, California, pp. 1-15.

Debar et al., Research Report: A Revised Taxonomy for Intrusion-Detection Systems, Oct. 25, 1999, IBM Research, Switzerland, pp. 1-23.

Porras et al., Emerald: Event Monitoring Enabling Responses to Anomalous Live Disturbances, Computer Science Laboratory, SRI International, Menlo Park, CA, Dec. 18, 1996, pp. 1-3.

Frequently-Asked Questions about RealSecure, pp. 1-14, http://web.archive.org/web/19970721183227/iss.net/prod/rs_faq.html, May 30, 1997.

Cisco Systems, Inc., Empowering the Internet Generation, 1998.

Internet Security Systems, Inc., RealSecure Release 1.2 for UNIX, A User Guide and Reference Manual, 1997.

Internet Security Systems, Inc., Real-time attack recognition and response: A solution for tightening network security, Jan. 1997, pp. 1-13.

Internet Security Systems, Inc., SAFEsuite Decisions User Guide, Version 1.0, 1998, pp. 1-78.

NetworkICE Corporation, ICEcap Administrator's Guide, Version 1.0 BETA, 1999, pp. 1-142.

Debar, Herve et al., A Neural Network Component for an Intrusion Detection System, 1992, pp. 240-250.

SRI International, A Prototype IDES: A Real-Time Intrusion-Detection Expert System, Aug. 1987, p. 1-63.

SRI International, Requirements and Model for IDES-A Real-Time Intrusion-Detection Expert System, Aug. 1985, pp. 1-70.

SRI International, An Intrusion-Detection Model, Nov. 1985, pp. 1-29.

Dowell et al., The ComputerWatch Data Reduction Tool, Proc. of the 13th National Computer Security Conference, Washington, D.C., Oct. 1990, pp. 99-108.

Fox et al., A Neural Network Approach Towards Intrusion Detection, Jul. 2, 1990, pp. 125-134.

Garvey et al., Model-Based Intrusion Detection, Oct. 1991, pp. 1-14.

Ilgun et al., State Transition Analysis: A Rule-Based Intrusion Detection Approach, Mar. 1995, pp. 181-199.

Javitz et al., The SRI IDES Statistical Anomaly Detector, May 1991, pp. 1-11.

SRI International, The NIDES Statistical Component Description and Justification, Mar. 7, 1994, pp. 1-46.

Karen, Oliver, PC Magazine, The Digital Doorman, Nov. 16, 1999, p. 68.

Liepins et al., Anomaly Detection: Purpose and Frameowrk, 1989, pp. 495-504.

Lindqvist et al., Detecting Computer and Network Misuse Through the Production-Bases Expert System Toolset (P-BEST), Oct. 25, 1998, pp. 1-20.

Lunt, Teresa, A survey of intrusion detection techniques, 1993, pp. 405-418.

Lunt, Teresa, Automated Audit Trail Analysis and Intrusion Detection: A Survey, Oct. 1988, pp. 1-8.

Porras et al., Penetration State Transition Analysis A Rule-Based Intrusion Detection Approach, 1992, pp. 220-229.

Sebring et al., Expert Systems in Intrusion Detection: A Case Study, Oct. 1988, pp. 74-81.

Shieh et al., A Pattern-Oriented Intrusion-Detection Model and Its Applications, 1991, pp. 327-342.

Smaha, Stephen, Haystack: An Intrusion Detection System, 1988.

Snapp, Steven Ray, Signature Analysis and Communication Issues in a Distributed Intrusion Detection System, 1991, pp. 1-40.

Porras et al., Emerald: Event Monitoring Enabling Responses to Anomalous Live Disturbances, Oct. 1997, pp. 353-365.

Lunt et al., Knowledge-Based Intrusion Detection, Mar. 1989, pp. 102-107.

Lunt et al., An Expert System to Classify and Sanitize Text, Dec. 1987, pp. 1-5.

Tener, William, Computer Security in the Age of Information, AI & 4GL: Automated Detection and Investigation Tools, 1989, pp. 23-29.

Teng et al., Adaptive Real-time Anomaly Detection Using Inductively Generated Sequential Patterns, 1990, pp. 278-284.

Vaccaro et al., Detection of Anomalous Computer Session Activity, 1989, pp. 280-289.

Winkler, J.R., A UNIX Prototype for Intrusion and Anomaly Detection in Secure Networks, 1990, pp. 115-124.

Boyen et al. Tractable Inference for Complex Stochastic Process, Jul. 24-26, 1998.

Copeland, Observing Network Traffic—Techniques to Sort Out the Good, the Bad, and the Ugly, 2000, pp. 1-7.

Goan, Terrance, Communications of the ACM, A Cop on the Beat Collecting and Appraising Intrusion Evidence, Jul. 1999, pp. 47-52.

Heberlein et al., A network Security Monitor, 1990, pp. 296-304.

Jackson et al., An Expert System Applications for Network Intrusion Detection, Oct. 1991, pp. 1-8.

Lankewicz et al., Real-Time Anomaly Detection Using a Nonparametric Pattern Recognition Approach, 1991, pp. 80-89.

Lippmann et al., Evaluating Intrusion Detection Systems: The 1998 DARPA Off-line Intrusion Detection Evaluation, 1999.

Munson et al., Watcher: The Missing Piece of the Security Puzzle, Dec. 2001.

Pearl, Judea, Probabilistic Reasoning in Intelligent Systems: Networks of Plausible Inference, Sep. 1988.

Porras et al., Live Traffic Analysis of TCP/IP Gateways, Dec. 12, 1997, pp. 1-13.

Emerald TCP Statitical Analyzer 1998 Evaluation Results, http://www.sdl.sri.com/projects/emerald/98-eval-estat/index.html, Jul. 9, 1999, pp. 1-15.

Staniford-Chen, GrIDS-A Graph Based Intrusion Detection System for Large Networks, Oct. 1996.

Tener, William, Discovery: An Expert System in the Commercial Data Security Environment, Dec. 1986; pp. 45-53.

Valdes et al., Adaptive, Model-Based Monitoring for Cyber Attack Detection, 2000, pp. 1-19.

SRI International, Blue Sensors, Sensor Correlation, and Alert Fusion, Oct. 4, 2000.

Valdes et al., Statistical Methods for Computer Usage Anomaly Detection Using NIDES, Jan. 27, 1995, pp. 306-311.

Wimer, Scott, The Core of CylantSecure, http://www.cylant.com/products/core.html, 1999, pp. 1-4.

Zhang et al., A Hierarchical Anomaly Network Intrusion Detection System using Neural Network Classification, Feb. 2001.

Cisco Secure Intrusion Detection System 2.1.1 Release Notes, http://www.cisco.com/univercd/cc/td/doc/product/iaabu/csids/csids3/nr211new.htm, Jun. 10, 2003, pp. 1-29.

Linux Weekly News, http://lwn.net/1998/0910shadow.html, Sep. 8, 1998, pp. 1-38.

Cracker Tracking: Tighter Security with Intrucsion Detection, http://www.bvte.com/art/9805/sec20/art1.htm, May 1998, pp. 1-8.

Cisco Systems, Inc., Newtork RS: Intrusion Detection and Scanning with Active Audit Session 1305, 1998.

Business Security Advisor Magazine, Intrusion Detection Systems: What You Need to Know, http://advisor.com/doc/0527, Sep. 1998, pp. 1-7.

Garvey et al., An Inference Technique for Integrating Knowledge from Disparate Sources, Multisensor Integration and Fusion for Intelligenct Machines and Systems, 1995, pp. 458-464.

Power et al., CSI Intrusion Detection System Resource, Jul. 1998, pp. 1-7.

Cisco Systems, Inc., NetRanger User's Guide Version 2.1.1, 1998.

Internet Security Systems, Real-Time Attack Recognition and Response: A Solution for Tightening Network Security, http://www.iss.net, 1997, pp. 1-13.

Network ICE Corporation, Network ICE Product Documentation, pp. 1-3, http://www.web.archive.org/web/20011005080013/www.networkice.com/support/documentation.html, Jul. 6, 2004.

Network ICE Corporation, Network ICE Documentation, p. 1, http://www.web.archive.org/web/19991109050852/www.networkice.com/support/docs.htm, Jul. 6, 2004.

Network ICE Corporation, Network ICE Press Releases, p. 1, http://www.web.archive.org/web/19990903214428/www.netice.com/company/pressrelease/press.htm, Jul. 7, 2004.

Network ICE Corporation, Network ICE Press Releases, p. 1, http://www.web.archive.org/web/20000304074934/www.netice.com/company/pressrelease/press.htm, Jul. 7, 2004.

Brentano et al., An Architecture for Distributed Intrusion Detection System, Department of Energy Computer Security Group, 14th Annual Conference Proceedings, pp. (17)25-17(45), May 1991.

Staniford-Chen et al., GrIDS-A Graph Based Intrusion Detection System for Large Networks, University of California, Davis, California, 19th National Information Systems Security Conference, 1996, pp. 1-10.

Ricciulli et al., Modeling Correlated Alarms in Network Management Systems, SRI International, Menlo Park, California, , Proceedings of the Conference on Communication Networks and Distributed System Modeling and Simulation, 1997, pp. 1-8.

Porras et al., Emerald: Event Monitoring Enabling Responses to Anomalous Live Disturbances, SRI International, Menlo Park, California, 20th National Information Systems Security Conference, Oct. 1997, pp. 1-24.

Porras et al., A Mission-Impact Based Approach to INFOSEC Alarm Correlation, SRI International, Menlo Park, California, Oct. 2002, pp. 1-33.

Phrack 55 Download (234 kb, Sep. 9, 1999), http://www.phrack.org/show.php?p=55&a=9, pp. 1-6.

Porras et al., A Mission-Impact-Based Approach to INFOSEC Alarm Correlation, SRI International, Menlo Park, California, Oct. 2002, pp. 1-19.

Bace, An Introduction to Intrusion Detection and Assessment for System and Network Security Management, 1999, pp. 1-38.

Hunteman, Automated Information System—(AIS) Alarm System, University of California, Los Alamos National Laboratory, 20th National Information System Security Conference, Oct. 1997, pp. 1-12.

Janakiraman et al., Indra: A Peer-to-Peer Approach to Network Intrusion Detection and Prevention, Proceedings of the 12th International Workshop on Enabling Technologies: Infrastructure for Collaborative Enterprises, 2003, pp. 1-5.

Innella, Intrusion Detection Systems (IDS), Navy Information Assurance, Jun. 28, 2004, pp. 1-4, http://www.infosec.navy.mil/ps/?t=infosecprodsservices/infosecprodsservices.tag&bc=/infosecprodsservices/b....

Curry, Intrusion Detection Systems, IBM Emergency Response Service, Coast Laboratory, http://www.cerias.purdue.edu/about/history/coast_resources/idcontent/ids.html, Jul. 19, 2004, pp. 1-28.

Lunt et al., Knowledge-Based Intrusion Detection, SRI International, Menlo Park, California, Conference on AI Systems in Government, Washington, D.C., Mar. 1989, pp. 102-107.

A. Information Assurance BAA 98-34 Cover Sheet, SRI International, Nov. 1, 2000, pp. 2-35.

NetScreen Products, FAQ, http://www.netscreen.com/products/faq.html, Feb. 28, 2003, pp. 1-6.

Miller, A Network Under Attack: Leverage Your Existing Instrumentation to Recognize and Respond to Hacker Attacks, NetScout Systems, Westford, MA, Apr. 2003, pp. 1-8.

Technology Brief: Intrusion Detection for the Millennium, Internet Security Systems, 2000, pp. 1-6.

Weiss et al., Analysis of Audit and Protocol Data using Methods from Artificial Intelligence, Siemens AG, Munich, Germany, Proc. of the 13th National Computer Security Conference, Washington, D.C., Oct. 1990, pp. 109-114.

Snapp et al., DIDS (Distributed Intrusion Detection System)—Motivation, Architecture, and an Early Protype), University of California, Davis California, , Proc. 14th National Computer Security Conference, Washington, D.C., Oct. 1991, pp. 167-176.

Internet Security Systems, Inc., SAFEsuite Enterprise Edition, Project "Gatekeeper" 1.0, Market Requirements Document, Mar. 30, 1998, pp. 1-12.

Internet Security Systems, SAFEsuite Decisions, 2000, pp. 1-2.

Internet Security Systems, Dynamic Threat Protection, Presse-Roundtable, Munich, Germany, Apr. 10, 2003, pp. 1-63.

Internet Security Systems, Preliminary ODM 1.0 Functional Specification, Aug. 1997, pp. 1-7.

Internet Security Systems, Inc., Scanner-ISSDK Interface, Design Specification, Jun. 2, 2000, Draft 1.07, pp. 1-7.

RealSecure, Adaptive Network Security Manager Module Programmer's Reference Manual, pp. 1-74.

Advanced Concept Technology Demonstrations (ACTD), 2005, pp. 1-28.
Frank, Sounding the Alarm, Sep. 6, 1999, Federal Computer Week, pp. 1-2.
Crumb, Intrusion Detection Systems to be Integrated at AFRL, Air Force Research Laboratory, News@AFRL, Fall 1999, pp. 1.
Temin, Case Study: The IA: AIDE System at Two, $15^{th}$ Annual Computer Security Applications Conference, Dec. 6-10, 1999, Phoenix, Arizona, pp. 1-26.
Spink, Automated Intrusion Detection Environment (AIDE), Intrusion Detection Sensor Fusion, Sep. 7, 1999, pp. 1-25.
Frincke et al., A Framework for Cooperative Intrusion Detection, $21^{st}$ National Information Systems Security Conference, Oct. 6-9, 1998, Crystal City, Virginia, pp. 1-20.
Anderson et al., In Athena's Camp: Preparing for Conflict in the Information Age, An Exploration of Cyberspace Security R&D Investment Strategies for DARPA: The Day After-in Cyberspace II, Chaper Eleven, 1996, pp. 253-271.
Valdes et al., SRI International, Probabilistic Alert Correlation, 2001, pp. 1-15.
Bass, Multisensor Data Fusion for Next Generation Distributed Intrusion Detection Systems, Apr. 28, 1999, Iris National Symposium, pp. 1-6.
Perrochon et al., Enlisting Event Patterns for Cyber Battlefield Awareness, No Date, Stanford University, pp. 1-12.
Perrochon, Using Context-Based Correlation in Network Operations and Management, Jul. 2, 1999, Stanford University, pp. 1-20.
Perrochon, Real Time Event Based Analysis of Complex Systems, Jun. 1998, pp. 1-9.
Luckham et al., Complex Event Processing in Distributed Systems, Aug. 18, 1988, Stanford University, pp. 1-26.
Pettigrew, US Southcom United States Southern Command's Information Sharing Projects, Summer 1999, IAnewsletter, vol. 3, No. 1, pp. 1-24.
Levitt et al., CMAD IV, Computer Misuse & Anomaly Detection, Session Summaries, Nov. 12-14, 1996, Proceedings of the Fourth Workshop on Future Directions in Computer Misuse and Anomaly Detection, Monterey, California, pp. 1-86.
Cheung et al., The Design of GrIDS: A Graph-Based Intrusion Detection System, Jan. 26, 1999, University of California, pp. 1-51.
Cohen et al., Report of the Reporting and Analysis Track, Detection of Malicious Code, Intrusions, and Anomalous Activities Workshop, Feb. 22-23, 1999, pp. 1-47.
Garofalakis et al., Network Mining and Analysis: The Nemesis Project, Bell Labs, Lucent Technologies, No Date, pp. 1-12.
RealSecure ICEcap Manager User Guide Version 3.6, Internet Security Systems, Inc., 1998-2002, pp. 1-228.
Cuppens, Cooperative Intrusion Detection, Date Unknown, pp. 1-10.
Mukherjee et al., Network Intrusion Detection, IEEE Network, May/Jun. 1994, pp. 26-41.
Machlis, Net Monitoring Tools Gain Real-Time Alerts, Apr. 14, 1997, http://www.computerworld.com, pp. 1-12.
OmniGuard/ITA Intruder Alert, AXENT Technologies, Inc., Nov. 17, 2004, http://www.web.archive.org, pp. 1-10.
NetRanger Overview, Chapter 1, Date Unknown, pp. 1-16.
Sutterfield, Large-Scale Network Intrusion Detection, 1997, WheelGroup Corporation, pp. 1-10.
Kumar et al., An Application of Pattern Matching in Intrusion Detection, Technical Report No. CSD-TR-94-013, Jun. 17, 1994, Purdue University, pp. 1-55.
Huang et al., A Large-Scale Distributed Intrusion Detection Framework Based on Attack Strategy Analysis, Date Unknown, The Boeing Company, pp. 1-12.
Perrochon et al., Event Mining with Event Processing Networks, Date Unknown, Stanford University, pp. 1-4.
Gruschke, Integrated Event Management: Event Correlation Using Dependency Graphs, presented at DSOM 1998, University of Munich, pp. 1-12.
Bass, Intrusion Detection System and Multisensor Data Fusion, Apr. 2000, Communications of the ACM, vol. 43, No. 4, pp. 99-105.
Bass et al., A Glimpse into the Future of ID, Date Unknown, Usenix, pp. 1-10.
LaPadula, State of the Art in Anomaly Detection and Reaction, Jul. 1999, Mitre Corporation, pp. 1-36.
Rationalizing Security Events with Three Dimensions of Correlation, Date Unknown, NetForensics, Tech Brief, pp. 1-6.
Jou et al., Design and Implementation of a Scalable Intrusion Detection System for the Protection of Network Infrastructure, Date Unknown, MCNC, pp. 1-15.
Caldwell, Event Correlation: Security's Holy Grail?, Aug. 1, 2002, GuardedNet, pp. 1-21.
Metcalf et al., Intrusion Detection System Requirements, Sep. 2000, Mitre Corporation, pp. 1-33.
Jou et al., Architecture Design of a Scalable Intrusion Detection System for the Emerging Network Infrastructure, Technical Report CDRL A005, Apr. 1997, MCNC, pp. 1-42.
Security Manager for UNIX Systems Version 3.2.1 User's Guide, Feb. 1998, Internet Security Systems, pp. 1-162.
RealSecure Release 1.2 for UNIX A User Guide and Reference Manual, 1997, Internet Security Systems, Inc., pp. 1-92.
Internet Scanner SAFE SAFEsuite 4.0 User Guide and Reference Manual, 1996, Internet Security Systems, Inc., pp. 1-158.
Internet Scanner 3.3 User Guide and Reference Manual, 1996, Internet Security Systems, Inc., pp. 1-119.
Landwehr et al., Newsletter of the IEEE Computer Society's TC on Security and Privacy Electronics, Electronic CIPHER, Nov. 25, 1997, Issue 25, pp. 1-34.
$20^{th}$ National Information Systems Security Conference, Oct. 6-10, 1997, Baltimore, Maryland, pp. 1-44.
EMERALD Alert Management Interface User's Guide Version 1.2, Dec. 6, 2000, SRI International, pp. 1-11.
Anderson et al., Detecting Unusual Program Behavior Using the Statistical Component of the Next-Generation Intrusion Detection Expert System (NIDES), May 1995, SRI International, pp. 1-89.
Lunt et al., Detecting Intruders in Computer Systems, 1993 Conference on Auditing and Computer Technology, SRI International, pp. 1-17.
Network ICE Products—ICEcap, Date Unknown, pp. 1-2.
Forlanda, The Secrets to Driving on BlackICE, Jan. 12, 2000, Network ICE, pp. 1-35.
BlackICE User's Guide Version 1.0 Beta Draft, 1999, Network ICE Corporation, pp. 1-59.
ICEcap Administrator's Guide Version 1.0 Beta Draft, 1999, Network ICE Corporation, pp. 1-25.
Shulak et al., ICEcap Advanced Administration Guide Version 3.0, 2001, Internet Security Systems Corporation, pp. 1-51.
"Real Secure, OS Sensor User Guide," Version 5.0, © Internet Security Systems, Inc. 199?-2000; Sep. 2000, pp. 1-64.
"Real Secure, User's Guide," Version 3.0, © 1992-1998, Internet Security Systems, Inc., pp. 1-128.
"System Security Scanner, User Guide," Version 1.6, © 1996-1998, Internet Security Systems, Inc., pp. 1-164.
"Real Secure™, Network Engine User Guide," Version 3.2.1, © 1999 by Internet Security Systems, Inc., pp. 1-38.
"Real Secure™, User Guide," Version 3.2.1, © 1999 by Internet Security Systems, Inc., pp. 1-38.
"Real Secure™, Manager for HP OpenView User Guide," Version 1.3, © 1999 by Internet Security Systems, Inc., pp. 1-48.
"Database Scanner, User Guide," Version 2.0, © 1992-1999, Internet Security Systems, Inc., pp. 1-112.
"Database Scanner™, User Guide," Version 4.0, © 2000 by Internet Security Systems, Inc., pp. 1-122.
"Database Scanner™, User Guide," Version 3.0.1, , © 1999 by Internet Security Systems, Inc., pp. 1-164.
"Real Secure™, Network Sensor User Guide," Version 5.0, © 2000 by Internet Security Systems, Inc., pp. 1-42.
"Real Secure, Server Sensor User Guide," Version 5.5, © Internet Security Systems, Inc. 2000, pp. 1-56.
"Internet Scanner™, User Guide," Version 6.0, Copyright © 1999 by Internet Security Systems, Inc., pp. 1-182.
"Internet Scanner™, User Guide," Version 6.1, © 2000 by Internet Security Systems, Inc., pp. 1-226.
"Internet Scanner™, User Guide," Version 5.6, © 1992-1998, Internet Security Systems, Inc., pp. 1-162.

"Internet Scanner™, User Guide," Version 5.3, © 1992-1998, Internet Security Systems, Inc. pp. 1-173.
"Real Secure, Console User Guide," Version 5.5, © 199?-2000, Internet Security Systems, Inc., pp. 1-162.
"Internet Scanner™, User Guide," Version 5.8, © 1999 by Internet Security Systems, Inc., pp. 1-148.
"SAFEsuite Decisions, User Guide," Version 1.0, © 1992-1998, Internet Security Systems, Inc., pp. 1-88.
"Real Secure™, Console User Guide," Version 5.0, © 2000 by Internet Security Systems, Inc., pp. 1-114.
"SAFEsuite Decisions, User Guide," Version 2.5, © 2000 by Internet Security Systems, Inc., pp. 1-194.
"System Scanner, User Guide," Version 1.7, © 1992-1998, Internet Security Systems, Inc., pp. 1-248.
"Sytem Scanner, User Guide," Version 1.0, © 1996-1998, Internet Security Systems, Inc., pp. 1-140.
"System Scanner™, User Guide," Version 4.0, © 1999 by Internet Security Systems, Inc., pp. 1-178.
Internet Security Systems, Inc., "Introduction to RealSecure Version 5.0, The Industry's Only Integrated Host-Based and Network-Based Intrusion Detection System", Aug. 22, 2000, pp. 1-47.
Internet Security Systems, Inc., "RealSecure Network Sensor and Gigabit Network Sensor Policy Guide Version 7.0", Aug. 2003, pp. 1-86.
Internet Security Systems, Inc., "RealSecure Console User Guide Version 3.1", Jun. 1999, pp. 1-98.
Internet Security Systems, Inc., "RealSecure Version 2.0", Apr. 1998, pp. 1-154.
Internet Security Systems, Inc., "Enhanced Dynamic Threat Protection via Automated Correlation and Analysis", an ISS White Paper, 2002, pp. 1-14.
Internet Security Systems, Inc., "RealSecure Site Protector Comparison Guide for Internet Scanner 7.0 Reporting Version 1.2", Mar. 2003, an ISS Tech Note, pp. 1-15.
Internet Security System, Inc., "RealSecure Site Protector Comparison Guide for ICEcap Manager Version 1.5", Jan. 2002, an ISS Technical White Paper, pp. 1-27.
Internet Security Systems, Inc., "RealSecure SiteProtector Security Fusion Module 2.0 Frequently Asked Questions", Mar. 2003, pp. 1-8.
Internet Security Systems, Inc., "RealSecure SiteProtector Console User Reference Guide Version 2.0 Service Pack 1", Mar. 14, 2003, Chapter 3, pp. 1-27.
Internet Security Systems, Inc., "Proventia Gateway and Network Protection", Jul. 2003, pp. 1-12.
Farley, Internet Security System, Inc., "ID Fusion Technology, A First-Generation Approach", Apr. 29, 1999, National Security Framework Forum, pp. 1-8.
Farley, "RealSecure Fusion Engine Concepts", an ISS White Paper, Jun. 30, 1999, pp. 1-23.
McGraw et al., "Secure Computing with Java: Now and the Future", 1997, http://java.sun.com/security/javaone97-whitepaper.html, pp. 1-20.

* cited by examiner

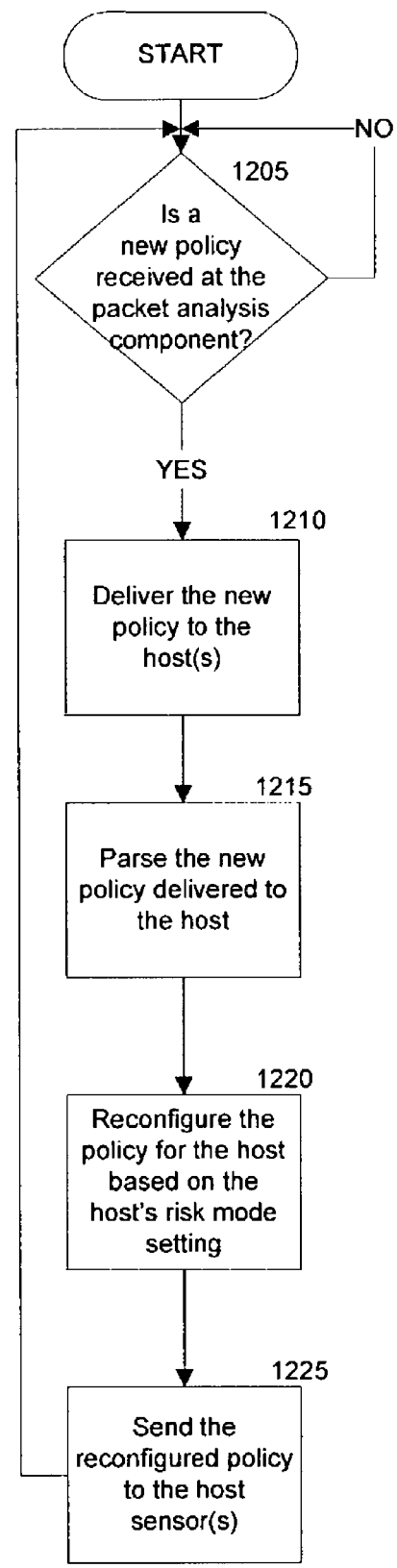
Fig. 12

METHOD AND SYSTEM FOR DYNAMICALLY PROTECTING A COMPUTER SYSTEM FROM ATTACK

STATEMENT OF RELATED PATENT APPLICATION

This non-provisional patent application claims priority under 35 U.S.C. §119 to U.S. Provisional Patent Application No. 60/441,422, titled Dynamic Threat Protection, filed Jan. 21, 2003. This provisional application is hereby fully incorporated herein by reference.

FIELD OF THE INVENTION

The present invention relates to the security of computer systems. More particularly, the present invention relates to a method and system for receiving a set of data, determining if the data should be blocked from the computer system, and selecting a method for blocking the data from the system.

BACKGROUND OF THE INVENTION

As e-commerce, or doing business over the Internet, becomes a way of life rather than being characterized as novel commercial activity, protecting computer systems against malicious attacks or alleged pranks becomes vital to both businesses and individuals because of potential economic disasters. In other words, because businesses and individuals are becoming more and more dependent upon computer systems that are integrated with the Internet, any interruptions in service or attacks on such computer systems could have devastating financial repercussions.

Attacks on computer systems that are integrated with the Internet typically include computer viruses, worms or Trojan horses. A computer virus is a broad term for a program that replicates itself. A virus can cause many different types of damage, such as deleting data files, erasing programs, or destroying everything found on a computer hard drive. Not every virus can cause damage; some viruses simply flash annoying messages on a computer screen. A virus can be received by downloading files from the Internet to a personal computer or through electronic mail.

Worms are programs designed to infect networks, such as the Internet. A worm travels from network to network replicating itself along the way. Trojan horses pretend to be a program that the user wishes to launch. A Trojan horse can be a program or file that disguises itself as normal, helpful programs or files, but in fact are viruses.

In addition to the above types of attacks, other computer incidents can include attacks against an Internet service provider ("ISP") or any computer connected to the Internet. One of the most common attacks against an ISP or any computer connected to the Internet is called a Smurf attack. In a Smurf attack, a target, such as an ISP or a computer connected to the Internet, is flooded with many "garbage" packets so that all of the target's available bandwidth is used up and the target or customers of the target or both cannot send or receive data by using e-mail, browsing the web, or any other Internet service.

As noted above, the nature of a distributed network, such as the Internet, makes it vulnerable to attack. The Internet was designed to allow for the freest possible exchange of information, data, and files. However, this free exchange of information carries a price: some users will try to attack the Internet and computers connected to the Internet; others will try to invade other users' privacy and attempt to crack databases of sensitive information or snoop around for information as it travels across Internet routes.

Two conventional methods exist for protecting computer systems from attack. One is a static method, which forces customers to upgrade or add new software to the system as time passes. These upgrades are called patches and they repair flaws in the software which previously allowed attacks to enter the system. The second method is intercept call hooking, which provides localized protection from some attacks that are not known about in advance by looking for abnormal procedure calls at a computer in the system. However, both methods can stop functional software from functioning due to false positive determinations of an attack on the system. While prior intrusion detection systems ("IDS") can detect attacks or make changes to security configurations of network computers and systems, these conventional systems do not have the capability to rapidly update the protection systems.

Accordingly, there is a need in the art for dynamically protecting a computer system from attacks via the Internet. That is, there is a need for a method and system for blocking attacks only against the components and hosts in the system which are vulnerable to such an attack. Furthermore, there is a need for correlating suspicious data packets received by a computer system against hosts or workstations that may be vulnerable to a particular type of attack to support the blocking of data packets for only the vulnerable hosts. A need also exists for a method and system capable of being updated with new attack nomenclature without having to modify files currently located on the system. Finally, a need exists for a method to quickly update a dynamic protection system to address attacks having catastrophic effects on the computer system.

SUMMARY OF THE INVENTION

A dynamic protection system ("DPS") provides real-time protection for computer systems, networks, and hosts from attacks via a distributed computer network, such as the Internet. For one aspect of the present invention, DPS can receive a data packet and determine whether to block the packet from passing into the system, network, or host. If the decision is made to block the packet, DPS can determine how to block the packet. DPS typically initiates one or more blocking methods, including active blocking and passive blocking.

Passive blocking typically occurs at the system and network levels. To passively block the data packet, the DPS can send a reset packet to the intruder, the party sending the packet, or the party to whom the packet was sent. The reset packet tells the party receiving it that the connection has been severed.

Active blocking typically occurs at the host and in-line networking levels. To actively block the data packet, the DPS retrieves information about the intruder or receiving party. The retrieved information can include a network address, an internet protocol port, a protocol code, or a protocol type. DPS can add the retrieved information to a blocking instruction, and apply the instruction to the data packet. The instruction can prevent this and subsequent data packets, having the same or similar characteristics as the retrieved information, from entering the system, network or host.

For another aspect of the present invention, DPS can generate a policy to protect a computing system. The policy typically contains a series of instructions which can be used by network and host sensors to identify packets of data that should be blocked to protect the computer system from an attack. The policy can be generated by assessing the system for vulnerabilities and creating a report detailing these vulnerabilities for the resources of the computer system. The policy can then be used by one or more sensors to assist in the evaluation of data packets for possible attacks on the system, network, or host.

A central source also can transmit a new policy to the computer system in the form of a "virtual" patch on a regular basis to update the scope of attack protection for the computer system. Rather than modify the current protection software running on the system, the virtual patch typically adds new protection software to assist the system in protecting itself from previously known and unknown types of attacks. An attack is "unknown" if a policy for preventing the attack has not been generated by or received at the system, network, or host at the time the attack occurs or the new policy is received.

BRIEF DESCRIPTION OF DRAWINGS

For a more complete understanding of exemplary embodiments of the present invention and the advantages thereof, reference is now made to the following description in conjunction with the accompanying drawings in which:

FIG. 12 is a flowchart illustrating a process for updating a protection policy in accordance with an exemplary embodiment of the present invention.

DETAILED DESCRIPTION OF THE EXEMPLARY EMBODIMENTS

Figure 1:
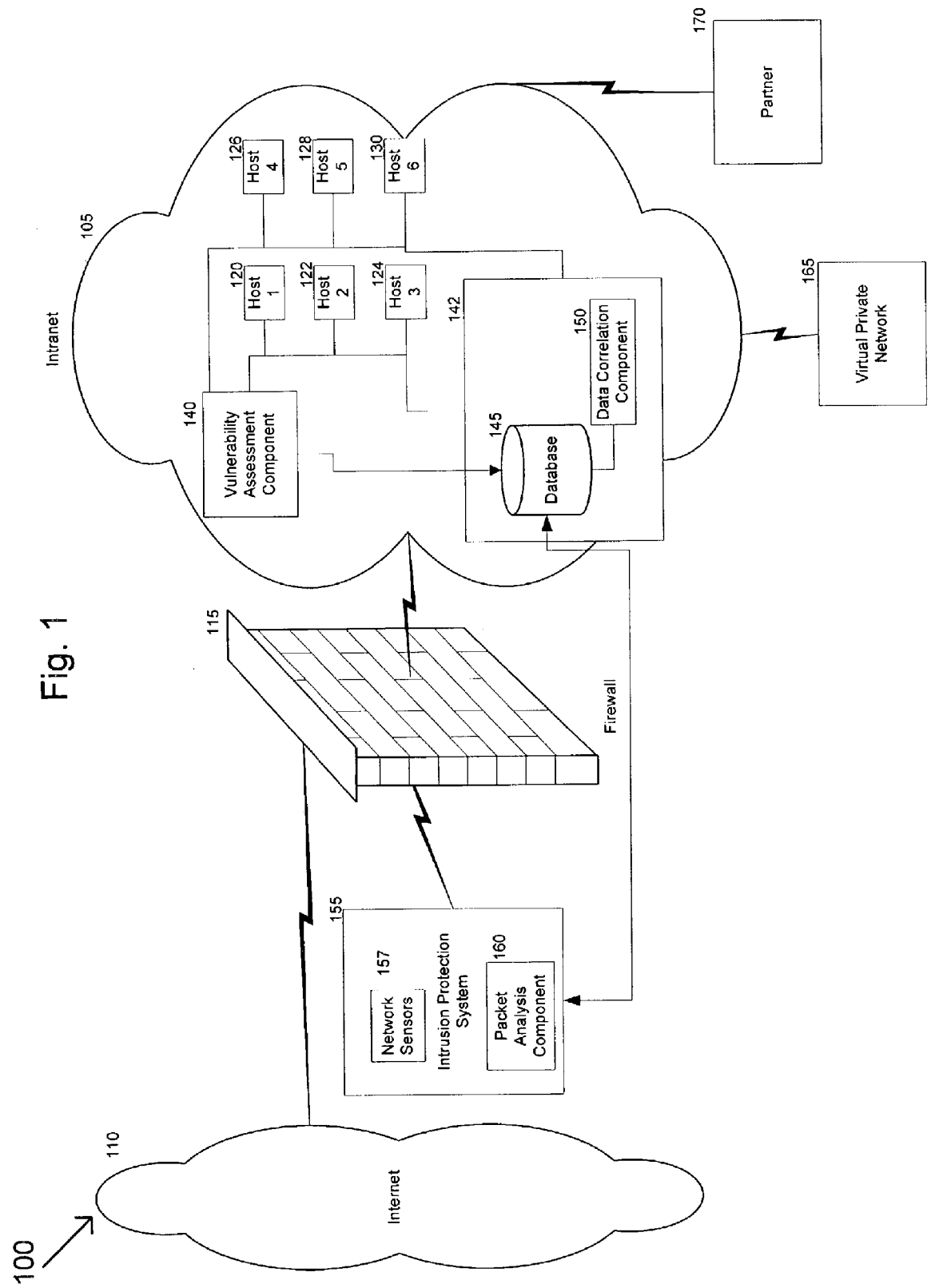
FIG. 1 is a block diagram of a system level dynamic protection system constructed in accordance with an exemplary embodiment of the present invention.

The present invention supports a computer-implemented method and system for dynamically protecting an online operation from attacks against its system, network and hosts. Exemplary embodiments of the invention can be more readily understood by reference to the accompanying figures.

Although exemplary embodiments of the present invention will be generally described in the context of program and hardware modules operating on a host, network, and system, those skilled in the art will recognize that the present invention can also be implemented in conjunction with other program modules for other types of hosts, networks and systems. Furthermore, those skilled in the art will recognize that the present invention may be implemented in a stand-alone or in a distributed computing environment. In a distributed computing environment, program and hardware modules may be physically located in different local and remote memory storage devices. Examples of such distributed computing environments include local area networks of an office, enterprise-wide computer networks, and the global Internet.

Exemplary embodiments of the present invention include a computer program which embodies the functions described herein and illustrated in the appended flowcharts. However, it should be apparent that there could be many different ways of implementing the invention in computer programming, and the invention should not be construed as limited to any one set of computer program instructions. Further, a skilled programmer would be able to write such a computer program to implement the disclosed invention without difficulty based on the flowcharts and associated description in the application text, for example. Therefore, disclosure of a particular set of program code instructions is not considered necessary for an adequate understanding of how to make and use the present invention. The inventive functionality of the claimed computer program will be explained in more detail in the following description in conjunction with the remaining figures illustrating the program flow. The detailed description which follows is represented largely in terms of processes and symbolic representations of operations by computer components.

Dynamic threat protection evolves disparate point solutions into an integrated prevention and protection system. Vulnerability assessment, firewall protection, protocol analysis to identify suspicious network traffic, virus blocking, application protection, behavioral analysis and protection policy updates all work as part of the same structure.

Each host shares critical security data with the other elements of the system. Pattern attacks that are difficult to detect by individual hosts become apparent once security is measured across the breadth of the system. Security policy preferably emanates from a centralized resource, which in turn handles data analysis and reporting for both technical and managerial oversight.

The overall protection system can be supported by global threat analysis and cutting-edge research. In other words, dynamic threat protection allows for real-time or near-real-time recognition of potential threats, and extremely rapid adjustment to changing security environments. Dynamic threat protection can recognize and adjust for new equipment or alterations in existing systems, networks, or hosts.

Dynamic threat protection can automatically learn how to work more effectively the longer it is in use. Dynamic threat protection searches for protection policies on networks, servers, hosts, and mobile systems. If none are found, security policies can be deployed from a central management environment and configured according to an enterprise-wide security policy. This part of the process can take place as part of a regularly scheduled assessment of the system, or on demand when new equipment is deployed.

Dynamic threat protection provides threat detection capabilities via protocol analysis, pattern matching, behavior analysis, and vulnerability assessment. Once all security policies are in place and have been verified as active and up to date, dynamic threat protection is ready to analyze the system, network, or hosts for vulnerabilities, both on demand and in response to suspicious activity occurring at the system, network, or host level. This vulnerability assessment is quickly parsed and analyzed at the host level, then passed up to the system environment for higher level correlation and analysis. In case of active attack, the exemplary system preferably has the capability to initiate appropriate investigative and defensive measures without direct administrator intervention, including the capability to block active attacks.

Dynamic threat protection assists traditionally independent security technologies to work together. Data collection, correlation and analysis capability break down into two separate components. The first, event correlation, is a real time, short term response in which the goal is to stop the event and limit the damage to the system, network, or host. The second, longer term component, threat correlation, uses information from a range of security events to assemble a recognizable threat pattern, then applies this knowledge across all systems, networks, and hosts as part of a basic risk assessment and remediation process.

Event correlation depends on network and host sensors capable of sorting through extensive device logs and intelligently escalating only the most relevant information to administrators. Threat correlation builds on the information parsed and processed at lower levels to recognize patterns and vulnerabilities that do not become apparent on a host-by-host basis. In either case, built-in analysis capabilities of dynamic threat protection reduce false positives, improve overall protection of the system, and help ensure business continuity.

Vulnerability assessment drives the dynamic threat protection process for two reasons: 1) discovery of what is actually part of the network; and 2) identification of what on the network might be vulnerable to attack or misuse. This information allows an enterprise to turn off unused services, identify and update protection policies on vulnerable software, and make educated decisions about which elements of the overall infrastructure require the most extensive protection measures. Once a decision is made to protect an element of the system, dynamic threat protection can determine whether to block the attack from entering the system or block elements of the system from receiving the attack while allowing the attack in to non-vulnerable elements. Furthermore, dynamic threat protection can determine how best to block the attack, whether it be actively, by preventing this and future attacks, or passively, by sending a signal to the attacker or the receiver ending this particular communication link.

Dynamic threat protection uses vulnerability assessment information to deliver basic event correlation. Threat correlation then comes about when the network and host sensors and the vulnerability assessment regimen work as part of an ongoing feedback. Information uncovered by vulnerability assessment helps set up significantly more effective prevention and protection processes, and allows the protection platform to route attack and misuse information back into the assessment process to ensure that successful attacks can't be repeated. This process takes place at the network, server, and host levels, and can be used to validate that any protection system is in place, up to date against the latest threats, and functioning properly.

Furthermore, all components of the dynamic threat protection system can receive protection policy updates to assist in defending against one or more new threats to the system, network, or hosts. These protection policy updates ensure that the dynamic threat protection system is up-to-date on the latest threats and security developments. Protection policy updates are preferably self-installing, and easily deployed from a central management system. The protection policy updates are an addition to and do not overwrite or modify prior protection policies, therefore limiting the need to shut down a system, network, or host in order to initiate the policy update. By adding instead of replacing protection policies, the dynamic threat protection system continues to have up-to-date protection policies while giving system administrators an opportunity to decide when to complete a complete system upgrade at a time when system downtime will not be detrimental to enterprise performance.

Referring now to the drawings, in which like numerals represent like elements throughout the several figures, aspects of the present invention and an exemplary operating environment of the implementation of the present invention will be described.

FIG. 1 is a block diagram illustrating an exemplary system level architecture for implementing a dynamic threat protection process in accordance with an exemplary embodiment of the present invention. Now referring to FIG. 1, the exemplary system 100 comprises an intranet 105, an Internet 110, a firewall 115, an intrusion protection system 155, a virtual private network ("VPN") 165 and a partner 170. The firewall 115 is communicably attached via a distributed computer network to the intranet 105, Internet 110, and intrusion protection system 155. The Internet 110 is a worldwide system of computer networks, in which users from one computer may get information from a second computer, if the user has permission or the second computer is not properly protected. The firewall 115 is a set of related programs, located at a network gateway, that protects the resources of a private network from users from other networks.

The intranet 105 typically comprises a private network that is contained within an enterprise. The intranet 105 can contain interlinked local area networks and have access to a wide area network. The intranet 105 typically includes one or more gateways to the Internet 110. The intranet 105 is communicably attached via a distributed computer network to the firewall 115, the intrusion protection system 155, the VPN 165 and the partner 170. The intranet 105 comprises a vulnerability assessment component 140, a data collection and correlation component 142 and multiple hosts 120-130.

The vulnerability assessment component 140 is communicably attached via a distributed computer network to the data collection and correlation component 142 and multiple hosts 120-130. The vulnerability assessment component 140 receives packets of data from outside the intranet 105. Once received, the packets are evaluated and the vulnerability of the system is determined by the vulnerability assessment component 140. The vulnerability assessment component 140 can then generate a report detailing the system's vulnerability, which is sent to the data collection and correlation component 142.

The data collection and correlation component 142 comprises a database 145 and a data correlation component 150 and is communicably attached via a distributed computer network to the intrusion protection system 155, the vulnerability assessment component 140, and multiple hosts 120-130. In one exemplary embodiment the database 145 is a SQL server database capable of storing the vulnerability assessment reports generated by the vulnerability assessment component 140.

The data correlation component 150 distills raw threat data into prioritized actionable information. The information can be prioritized by the level of threat a data packet poses to the system 100. In one exemplary embodiment, the types of correlation completed by the data correlation component 150 includes: target, comparative, advanced analysis, and custom correlation. Asset correlation assesses events and incidents based on a prioritized view of an organization's protected assets, where the most valuable or crucial business assets take priority over lesser events. Comparative correlation compares anomalous network threat activity to known baselines and previous vulnerability assessments, helping to determine the enterprise's overall threat situation and risk exposure. Advanced analysis correlation allows a security administrator to select one or more events and conduct an in-depth analysis of the suspected attack. Custom correlation provides the security administrator with the ability to tailor intrusion protection defenses to meet enterprise specific needs.

The hosts 120-130 are communicably attached via a distributed computer network to the vulnerability assessment component 140 and the data collection and correlation component 142. A host can be any computer or electronic device having full two-way access to other computers or electronic devices on the intranet 105 or Internet 110. In one exemplary embodiment, a first host 120 is a desktop computer communicably attached to the intranet 105.

The VPN 165 is communicably attached via a distributed computer network to the intranet 105. The VPN 165 provides a method of using public telecommunications infrastructure to provide remote offices or individual users with a secure access to the enterprises computing network. The partner 170 is communicably attached via a distributed computer network to the intranet 105. The partner 170 represents one or more separate and distinct enterprises, other than the enterprise which owns the system 100, which has been given access to the system 100 based on the close working relationship between the enterprises. In one exemplary embodiment, the partner 170 is implemented by an extranet.

The intrusion protection system 155 is communicably attached via a distributed computer network to the Internet 110, the intranet 105, the firewall 115 and the data collection and correlation component 142. The intrusion protection system 155 comprises one or more network sensors 157 and a packet analysis component 160. The network sensor 157 is communicably attached via a distributed computer network to the packet analysis component 160 and the data collection and correlation component 142. The network sensor 157 receives instructions from the data correlation component 150 and either blocks packets of data or allows them to pass into the system 100 based on those instructions. The packet analysis component 160 contains data analysis programs to analyze network traffic on the system 100 to determine if the traffic is malicious. The packet analysis component 160 can also normalize network traffic to allow it to be analyzed. Furthermore, the packet analysis component 160 can reassemble traffic which enters the system 100 scrambled so that the traffic can be analyzed.

In one exemplary embodiment, a packet analysis component is located on each host 120-130. For an alternative exemplary embodiment, the system 100 has at least one intrusion protection system 155. The intrusion protection system 155 can be placed between the Internet 110 and the firewall 115 or between the firewall 115 and the intranet 105. In an alternative exemplary embodiment, the intrusion protection system 155 can be placed "in-line" with the intranet 105 and another network, such as the partner 170. In this alternative exemplary embodiment, the network connection to the intranet 105 can be blocked and every packet can be analyzed by the network sensors 157.

Figure 2:
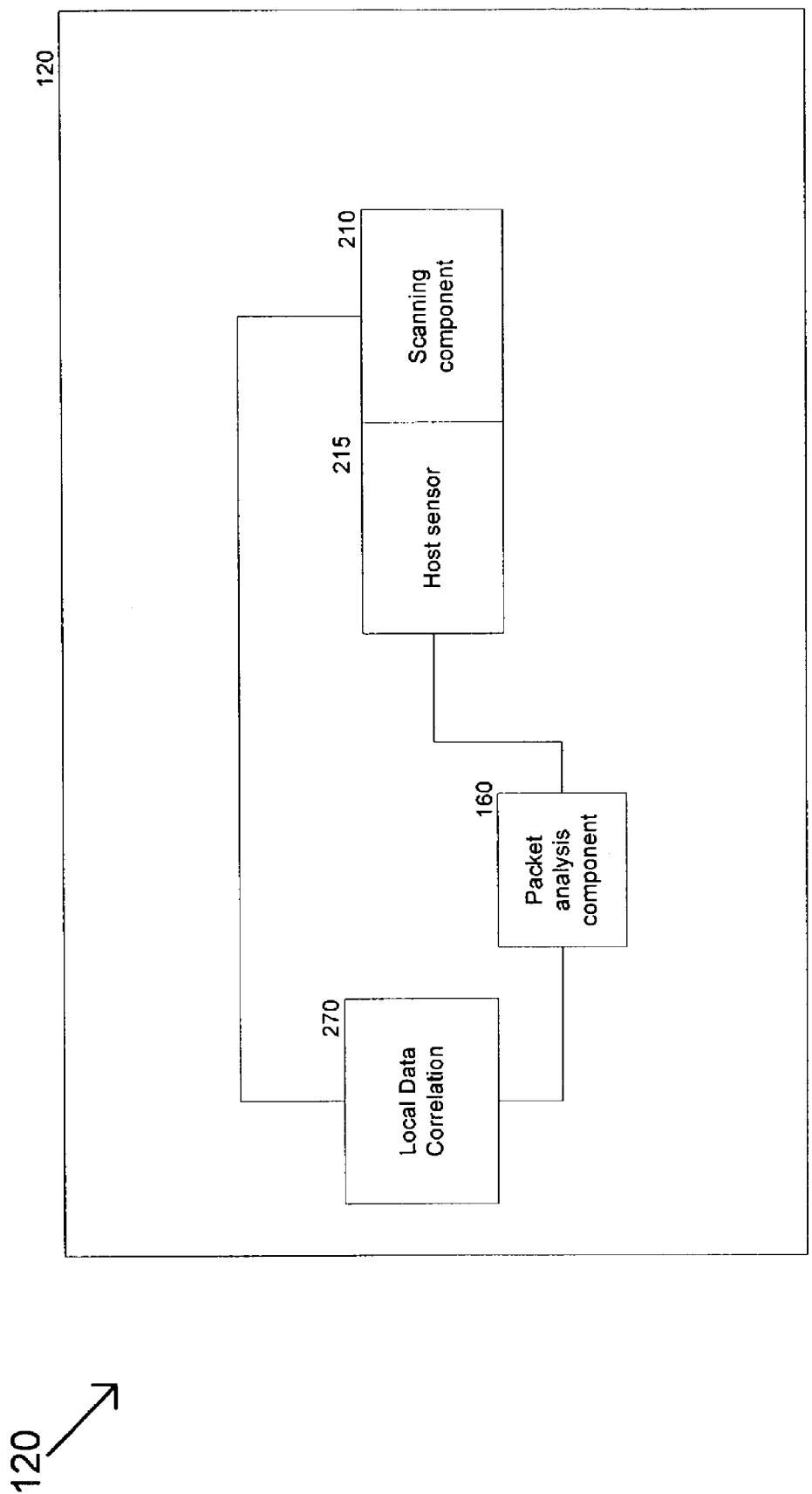
FIG. 2 is a block diagram of a host level dynamic protection system constructed in accordance with an exemplary embodiment of the present invention.

FIG. 2 is a block diagram illustrating an exemplary host 120 level architecture for implementing a dynamic threat protection process in accordance with an exemplary embodiment of the present invention. Now referring to FIG. 2, the exemplary host 120 comprises a scanning component 210, a host sensor 215, a local data correlation component 270 and a packet analysis component 160. The scanning component 210 is communicably attached to the local data correlation component 270 and the host sensor 215. The local data correlation 270 is communicably attached to the packet analysis component 160 and the scanning component 210. The packet analysis component 160 is communicably attached to the local data correlation component 270 and the host sensors 215.

The scanning component 210 receives the packet from the system 100, parses the packet header, determines the type of protocol used by the packet, and determines the host's 120 vulnerability to the packet. The scanning component passes this information along with the packet to the local data correlation component 270. The local data correlation component can modify the protection policy for the host 120 by evaluating the packet and the vulnerabilities of the host 120 and identifying blocking methods for reducing or eliminating those vulnerabilities. The packet analysis component 160 contains algorithms to analyze network traffic on the host 120 to determine if the traffic is malicious. The host sensor 215 receives instructions from the local data correlation component 270 and the packet analysis component 160 and either blocks packets of data or allows them to enter into the host 120 based on those instructions.

Figure 3:
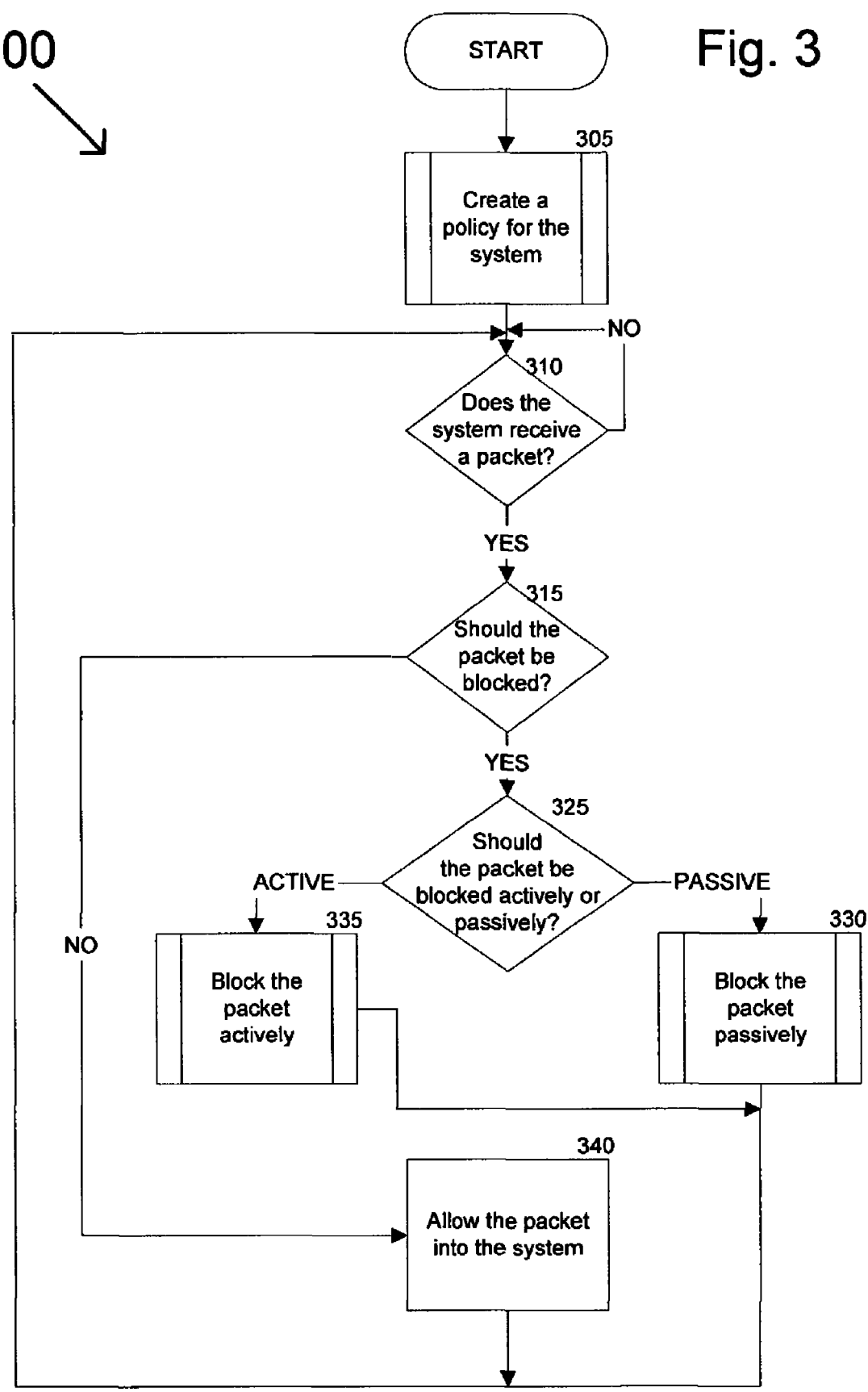
FIG. 3 is a flowchart illustrating a process for dynamically protecting a system in accordance with an exemplary embodiment of the present invention.

FIGS. 3-12 are logical flowchart diagrams illustrating the computer-implemented processes completed by an exemplary method for dynamically protecting an online business operation from attacks against its system, network and hosts. FIG. 3 is a logical flowchart diagram 300 presented to illustrate the general steps of an exemplary process for dynamically protecting a computer system within the representative operating environment of the system 100 of FIG. 1.

Now referring to FIGS. 1 and 3, the exemplary method 300 begins at the START step and proceeds to step 305, in which a policy is created for the system 100 by the data correlation component 150. In step 310, an inquiry is conducted to determine if the system 100 receives a packet from a source outside the system 100, such as the Internet 110. The packet is received at the network sensor 157 and typically contains a data stream and a packet header. If a packet is not received, the "NO" branch is followed to step 310. If a packet is received by the system 100, the "YES" branch is followed to step 315. In step 315, an inquiry is conducted to determine if the received packet should be blocked. If so, the "YES" branch is followed to step 325 for a further determination on how to block the received packet. If a decision is made to pass the packet, the "NO" branch is followed to step 340, where the data correlation component 150 allows the packet to enter the system 100. From step 340, the process returns to step 310. If the packet is blocked, the data correlation component 150 will not allow the packet to enter the system 100. The blocking determination typically occurs within the intrusion protection system 155.

In step 325, an inquiry is conducted to determine if the intrusion protection system 155 blocks the packet actively or passively. A packet is blocked passively by the system 100, network or host 120 sending a reset packet to either a host 120 or the party sending the packet. The party or host 120 receiving the reset packet is informed that the connection has been terminated. The party or host 120 could attempt to reconnect immediately after receiving the reset packet. A packet is blocked actively by the system 100, network or host 120 gathering network access information from the party sending the packet or its intended receiver or both and preventing packets from being received from a party having the same network access information. For example, the system 100 can determine the network address of the party sending the packet. The system 100 instructs the intrusion protection system 155 to allow any packets from the same network address to pass into the system 100 for a certain period of time. The time period can be short, or indefinite depending on user preferences.

If blocking is done passively, the "PASSIVE" branch is followed to step 330, where the packet is passively blocked. If the intrusion protection system 155 determines that the packet should be blocked actively, the "ACTIVE" branch is followed to step 335, where the packet is actively blocked. In one exemplary embodiment, packets received and analyzed at the system level 100 are blocked passively from the system 100. The process returns to step 310.

Figure 4:
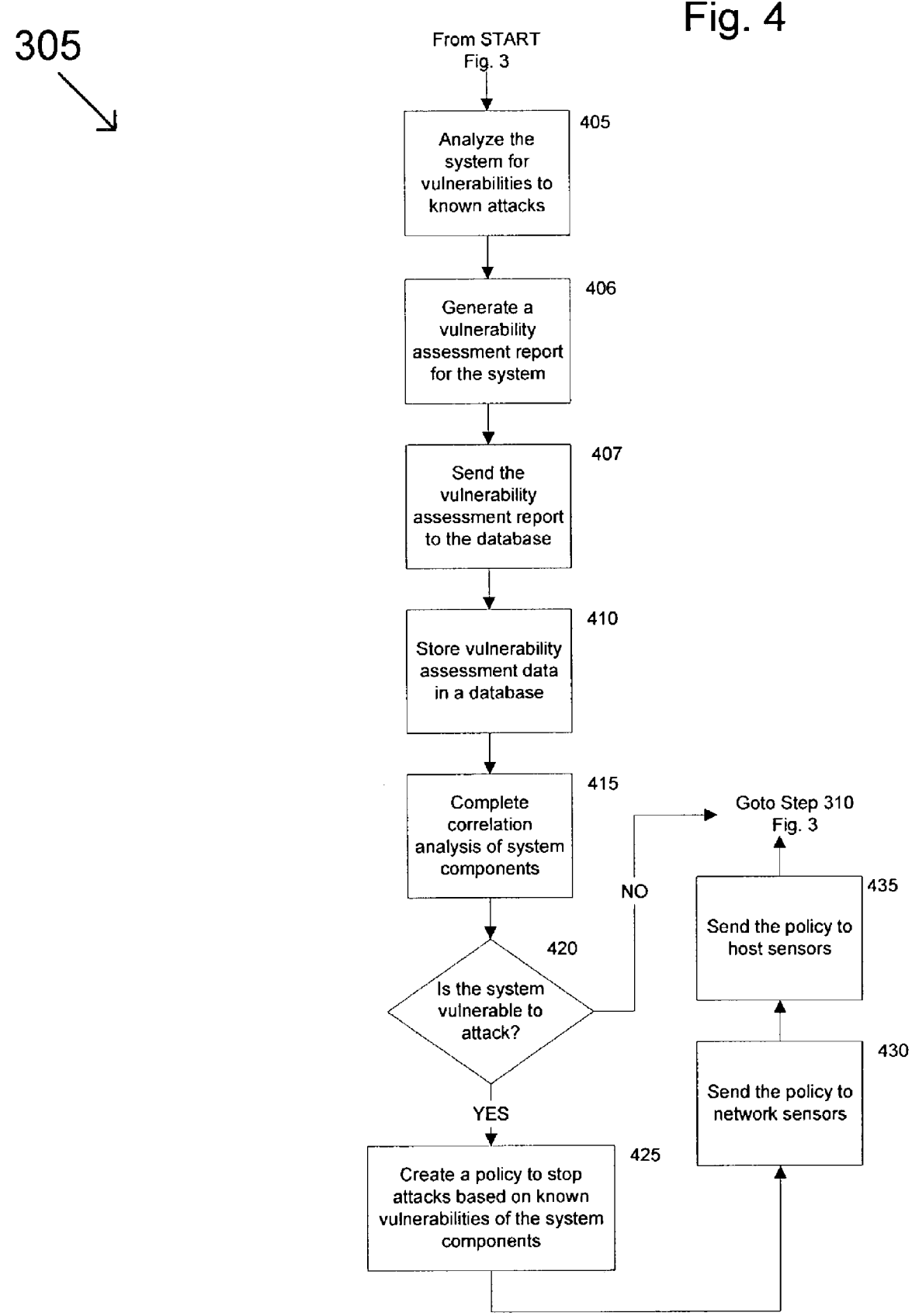
FIG. 4 is a flowchart illustrating a process for generating a system level policy to dynamically protect the system in accordance with an exemplary embodiment of the present invention.

FIG. 4 is a logical flowchart diagram illustrating an exemplary computer-implemented method for the creation of a policy by the data correlation component 150 in the system 100 as completed by step 305 of FIG. 3. Referencing FIGS. 1 and 4, the exemplary method 305 begins with the vulnerability assessment component 140 assessing the system 100 for vulnerabilities to known attacks in step 405. An attack is a known attack if it has been used previously to attack this or other systems 100 and data is available to define the characteristics of the attack. In step 406, the vulnerability assessment component 140 creates a vulnerability assessment report based on the assessment. The vulnerability assessment component 140 sends the vulnerability assessment report to the database 145 in the data collection and correlation component 142 in step 407. In step 410, database 145 stores the vulnerability assessment report and makes it available to the data correlation component 150.

In step 415, the data correlation component 150 completes a correlation analysis of the data provided in the vulnerability assessment report against a set of known information about the system 100. The set of known information includes the system parameters, the software running on the system 100, the number and location of networks and hosts 120 with access to the system 100 and a prioritized order of protecting different areas of the system 100 from differing levels of attack. Correlation is the process of distilling raw threat data into prioritized actionable information. The object of a correlation analysis is to spot real threats to the system 100 immediately and minimize or eliminate false positives of non-threatening packets.

In step 420, an inquiry is conducted to determine if the system 100 is vulnerable to attacks based on the correlation analysis completed by the data correlation component 150. If not, the "NO" branch is followed to step 310 of FIG. 3. If the system 100 is vulnerable to attack, the "YES" branch is followed to step 425, where the data correlation component 150 creates a policy to stop attacks. The policy created by the data correlation component 150 is typically based on known vulnerabilities of the components of the system 100. In step 430, the data correlation component 150 sends the policy to the intrusion protection system 155, which distributes the policy to the network sensors 157. In step 435, the data correlation component 150 sends the policy to the host sensors 180. In one exemplary embodiment, each host, 120-130, contains a host sensor 180 at the host 120. The process then continues to step 310 of FIG. 3.

Figure 5:
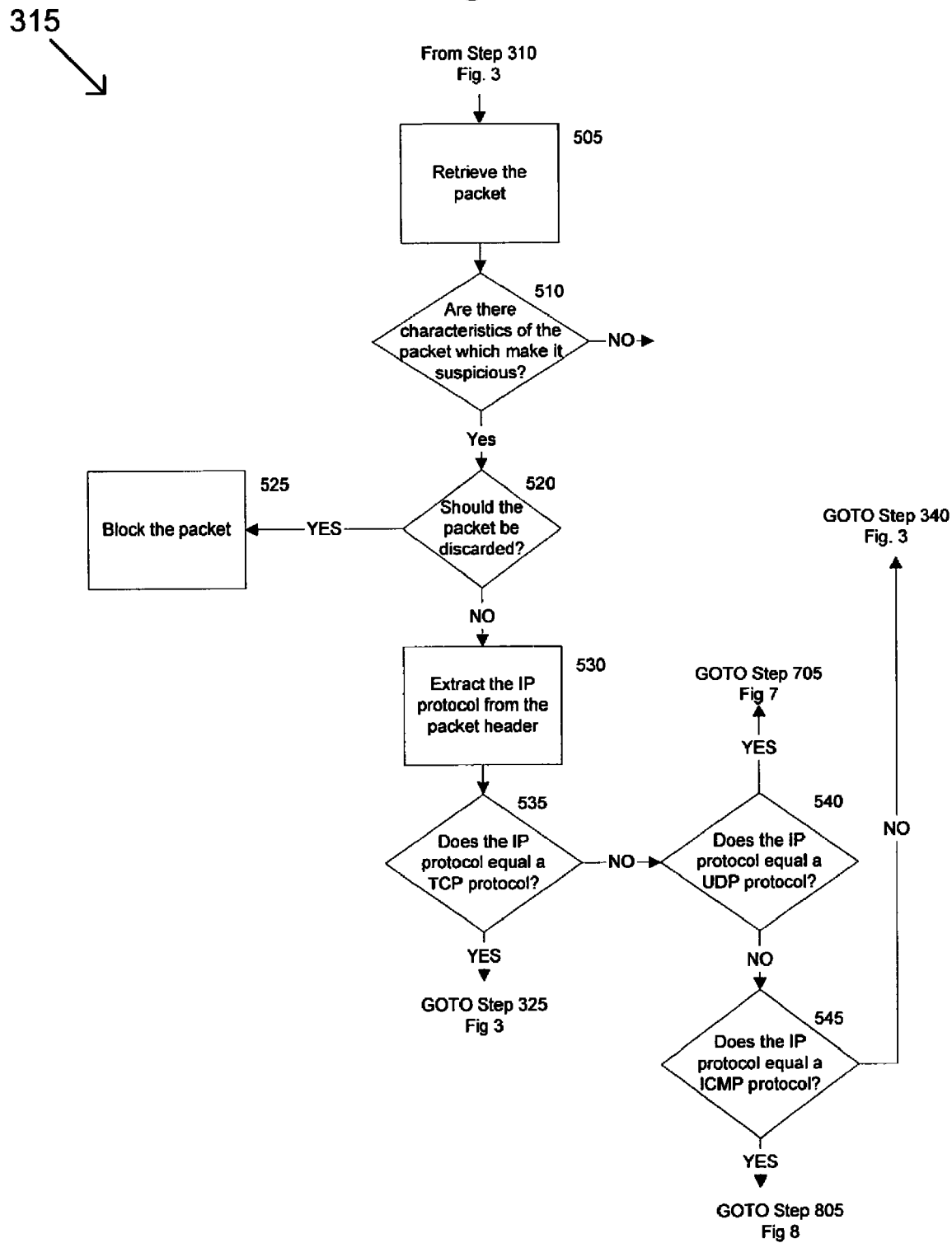
FIG. 5 is a flowchart illustrating a process for determining if a packet of data contains a suspicious event in accordance with an exemplary embodiment of the present invention.

FIG. 5 is a logical flowchart diagram illustrating an exemplary computer-implemented method for determining whether to block a packet from entering a system 100 as completed by step 315 of FIG. 3. Referencing FIGS. 1, 2, and 5, the exemplary method 315 begins with the IPS 155, network sensor 157, or host sensor 210 receiving a packet in step 505. The component receiving the packet can depend on whether a system, network, or host is being protected. In step 510, an inquiry is conducted to determine if the packet contains characteristics which make it suspicious. A packet can contain suspicious characteristics if it resembles packets which have infected this or other systems 100, networks, or hosts 120 previously. The packet's signature can be analyzed to make this determination. Information retrieved from the packet analysis component 160 assists in determining if the packet contains suspicious characteristics. If the packet does not contain suspicious characteristics, the "NO" branch is followed to step 515, where another packet is received and the process returns to step 510. If the packet does contain suspicious characteristics, the "YES" branch is followed to step 520.

In step 520, an inquiry is conducted to determine if the packet should be discarded based on the determination that the packet contained suspicious characteristics. If so, the "YES" branch is followed to step 525, where the packet is blocked from the system 100, network, or host 120. If further analysis of the packet is necessary, or desired, the "NO" branch is followed to step 530, where the IP protocol of the packet is extracted from the packet header by the data correlation component 150, local data correlation component 270, or based on signature information in the packet header, depending on if the packet is received at the system 100, network, or host 120. In step 535, an inquiry is conducted to determine if the IP protocol in the packet header is a Transmission Control Protocol ("TCP protocol"). If so, the "YES" branch is followed to step 325 of FIG. 3. However, if the IP protocol is not a TCP protocol, the "NO" branch is followed to step 540. In step 540, an inquiry is conducted to determine if the IP protocol in the packet header is a User Datagram Protocol ("UDP protocol"). If so, the "YES" branch is followed to step 705 of FIG. 7. If the protocol is not a UDP protocol, then the "NO" branch is followed to step 545. In one exemplary embodiment, packets containing UDP protocols are only blocked actively. In step 545, an inquiry is conducted to determine if the IP protocol in the packet header is an Internet Control Message Protocol ("ICMP protocol"). If so, the "YES" branch is followed to step 805 of FIG. 8. However, if the IP protocol is not an ICMP protocol, then the "NO" branch is followed to step 340 of FIG. 3, where the packet is allowed to pass into the system 100. In one exemplary embodiment, packets containing ICMP protocols are only blocked actively by the host sensors 215.

Figure 6:
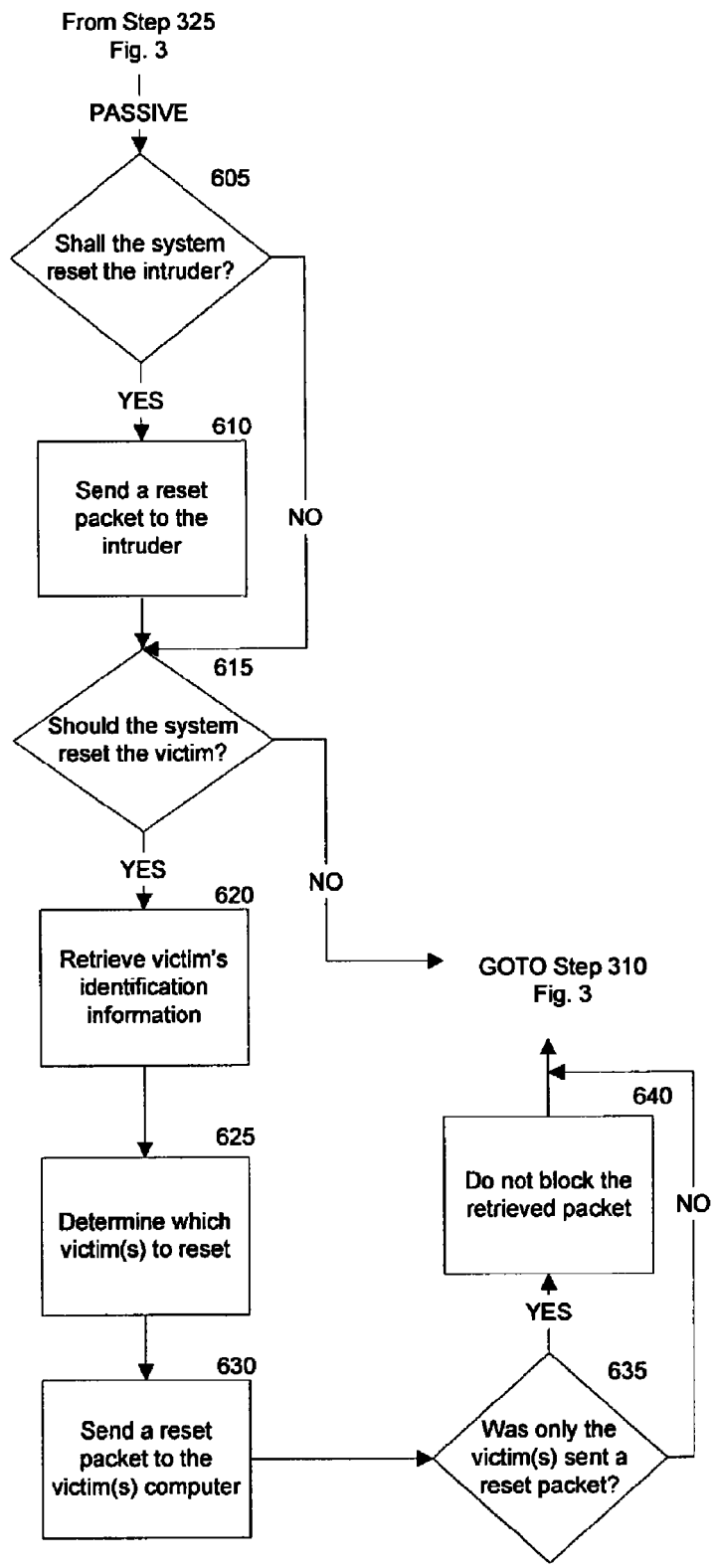
FIG. 6 is a flowchart illustrating a passive process for blocking the packet of data in accordance with an exemplary embodiment of the present invention.

FIG. 6 is a logical flowchart diagram illustrating an exemplary computer-implemented method for the intrusion protection system 155 or network sensors 157 passively blocking a packet as completed by step 330 of FIG. 3. Now referring to FIGS. 1, 2, and 6, the exemplary method 330 begins with an inquiry conducted to determine if the system 100 should reset the intruder in step 605. The intruder is the origination point from which the packet was received. If the intruder should be reset, the "YES" branch is followed to step 610, where the packet analysis component 160 sends a reset packet to the intruder. The reset packet indicates to the intruder that the conversation has been terminated by the system 100. The process continues to step 615. If the intruder should not be reset, the "NO" branch is followed to step 615.

In step 615, an inquiry is conducted to determine if the victim should be reset. The victim is the host 120, network, or system 100 which is receiving the packet. In one exemplary embodiment, the signature within the packet header determines whether to reset the intruder, the victim, or both. In another exemplary embodiment, the policy created by the data correlation component 150 or local data correlation component 270 or signature information in the packet header determines whether to reset the intruder, the victim, or both. If the victim is not reset, the "NO" branch is followed to step 310 of FIG. 3. On the other hand, if the victim should be reset, the "YES" branch is followed to step 620, where the network sensor 157 retrieves the victim's identification information. The identification information typically includes the Internet protocol address of the network or system 100. In step 625, the data correlation component 150 determines which victim(s) to reset based on the retrieved identification information and the known vulnerabilities of the system 100. A reset packet is sent to the victim system 100 in step 630. The reset packet instructs the victim to end the conversation with the intruder.

In step 635, an inquiry is conducted to determine if the victim(s) was the only party that was sent a reset packet. If so, the "YES" branch is followed to step 640, where packet received from the intruder is not blocked. The process continues to step 310 of FIG. 3. If both the victim(s) and the intruder were sent reset packets, the "NO" branch is followed to step 310 of FIG. 3.

Figure 7:
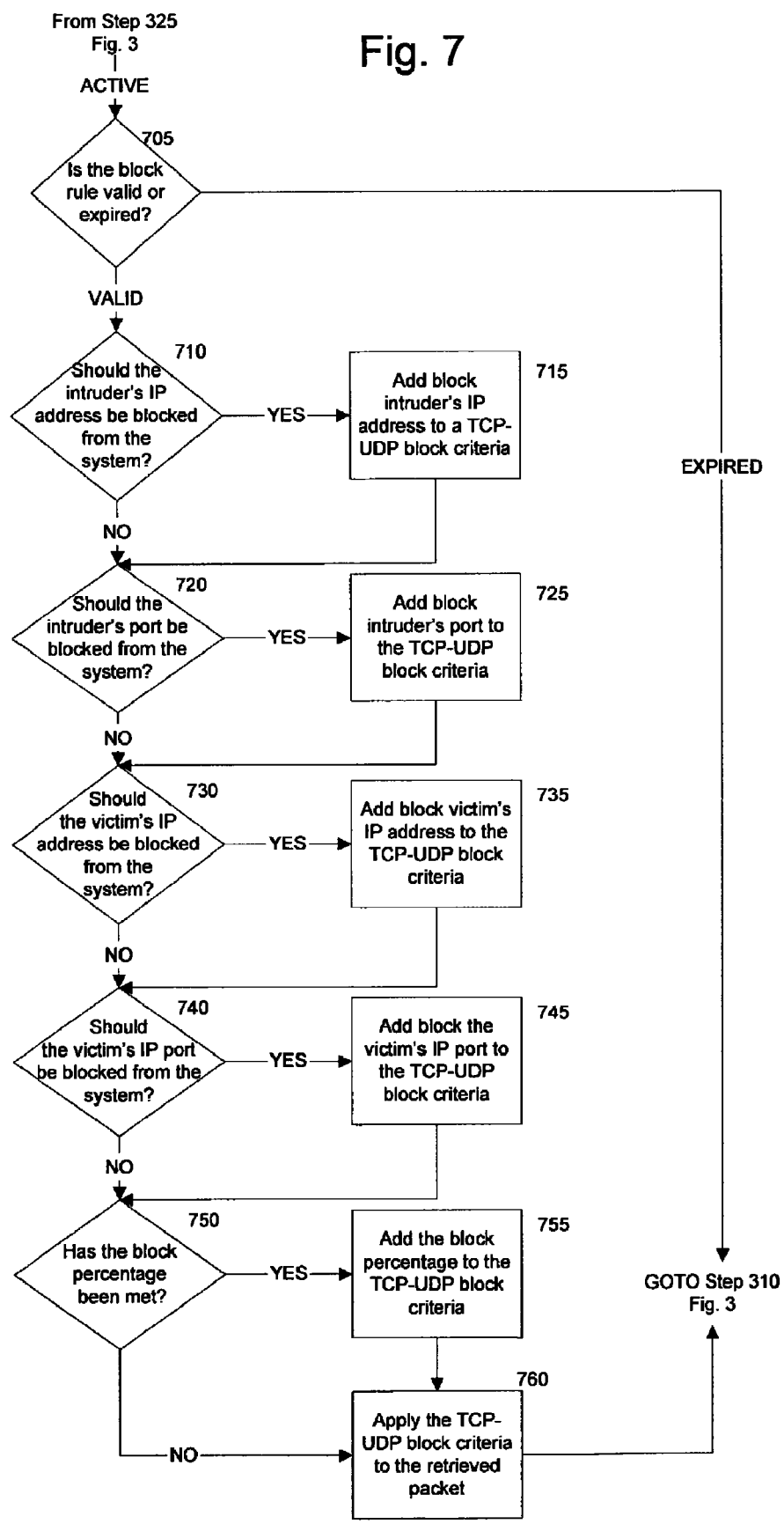
FIG. 7 is a flowchart illustrating an active process for blocking the packet of data in accordance with an exemplary embodiment of the present invention.

FIG. 7 is a logical flowchart diagram illustrating an exemplary computer-implemented method for host sensors 215 actively blocking packets containing TCP or UDP protocols at the host 120 as completed by step 335 of FIG. 3. Referencing FIGS. 1, 2, and 7, the exemplary method 335 begins with an inquiry to determine if the block rule used to block the packet is valid or expired in step 705. Rules for blocking a packet are typically stored in the packet analysis component 160. In one exemplary embodiment, the rules can have a lifetime, or period which they will be applied, after which, the rule is considered expired and no longer enforced. If the rule is expired, the "EXPIRED" branch is followed to step 310 of FIG. 3, where an inquiry is conducted to determine if another packet is received at the host 120. If the rule is not expired, the "VALID" branch is followed to step 710.

In step 710, an inquiry is conducted to determine if the intruder's Internet protocol address ("IP address") should be blocked from the system 100. The determination is typically made by the data correlation component 150, the local data correlation component 270, or based on signature information in the packet header. If the intruder IP address should be blocked, the "YES" branch is followed to step 715, where an instruction to block the intruder's IP address is added to a TCP-UDP block criteria in the packet analysis component 160. The process continues to step 720. If the intruder IP address should not be blocked, the "NO" branch is followed to step 720. In step 720, an inquiry is conducted to determine if the intruder's port should be blocked from the system 100. The determination is typically made by the data correlation component 150, the local data correlation component 270, or based on signature information in the packet header. If the intruder's port should be blocked, the "YES" branch is followed to step 725, where an instruction to block the intruder's port as well as the number of the intruder's port is added to the TCP-UDP block criteria. The process continues to step 730. If the intruder's port should not be blocked, the "NO" branch is followed to step 730.

In step 730, an inquiry is conducted to determine if the victim's IP address should be blocked from the system 100. The determination is typically made by the data correlation component 150, the local data correlation component 270, or based on signature information in the packet header. The victim typically includes a host 120. Blocking the host's 120 IP address from the system 100 would isolate the host 120 from the rest of the system 100 or network. The host 120 may have unique vulnerabilities which make it easier to isolate the host rather than block the intruder from the entire system 100 or fix the system 100 as a whole. In one exemplary embodiment, the host 120 is isolated from the system if the host 120 is not currently in use, or does not need access to the system 100 in order to function properly. If the victim's IP address should be blocked from the system 100, the "YES" branch is followed to step 1035, where an instruction containing the victim's IP address is added to the TCP-UDP block criteria. The process continues to step 740. If the victim's IP address should not be blocked, the "NO" branch is followed to step 740.

In step 740, an inquiry is conducted to determine if the victim's IP port should be blocked from the system 100. The determination is typically made by the data correlation component 150, the local data correlation component 270, or based on signature information in the packet header. If so, the "YES" branch is followed to step 745, where an instruction containing the victim's IP port is added to the TCP-UDP block criteria in the packet analysis component 160. The process continues to step 750. If the victim's port should not be blocked, the "NO" branch is followed to step 750, where an inquiry is conducted to determine if a block percentage is met. The block percentage is a numerical value in the data correlation component 150 or the local data correlation component 270 that evaluates the number of packets being blocked as compared to the total number of packets received by the system 100 or the host 120. If the numerical value is reached, or met, then the packet currently being evaluated is blocked from the host 120 and system 100. If the block percentage has been met, the "YES" branch is followed to step 755, where an instruction that the block percentage has been met is added to the TCP-UDP block criteria. The process continues to step 760. If the block percentage has not been met, the "NO" branch is followed to step 760, where the host sensor 215 applies the TCP-UDP block criteria to the received packet. The process continues to step 310 of FIG. 3.

Figure 8:
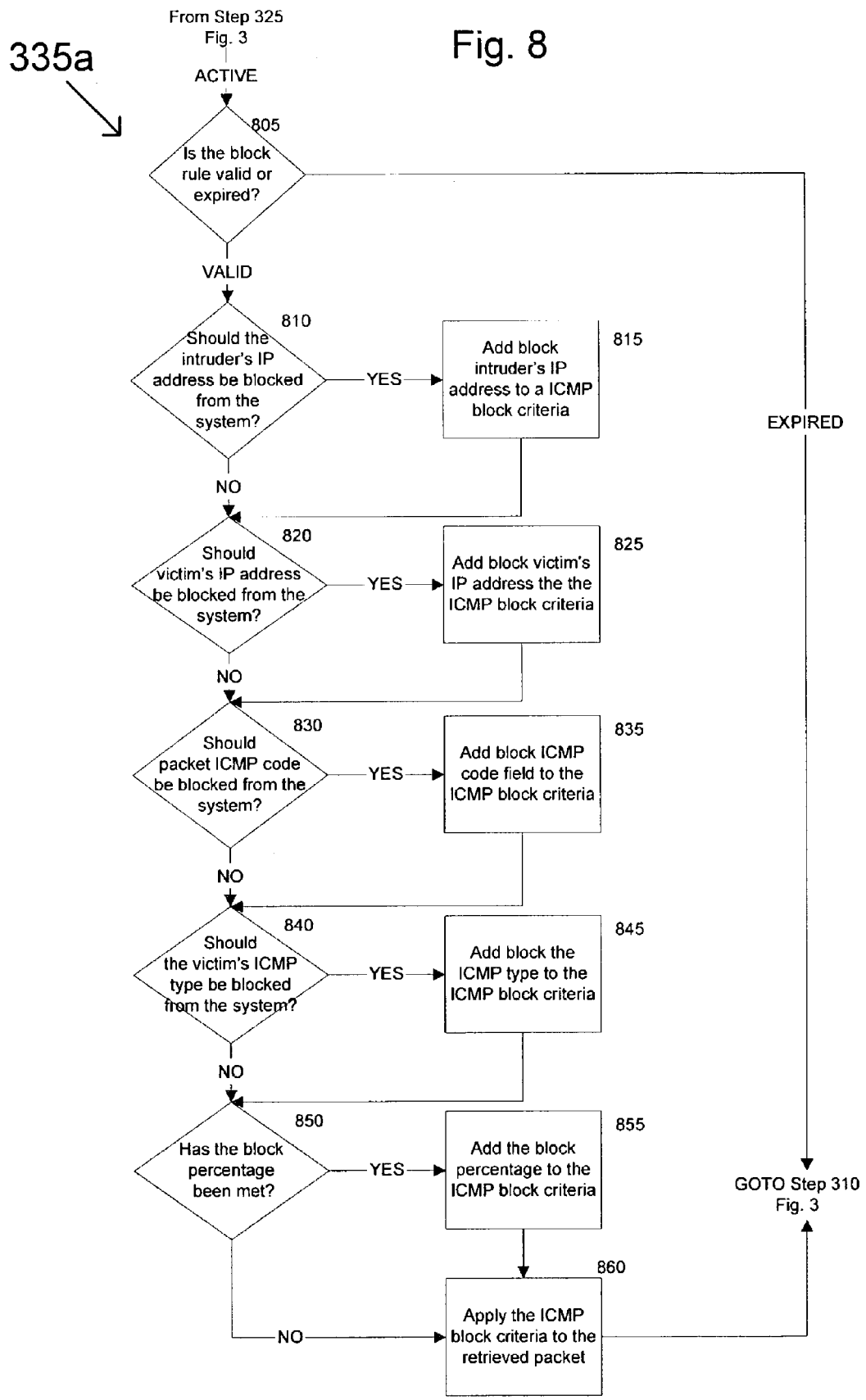
FIG. 8 is a flowchart illustrating an alternative active process for blocking a packet of data in accordance with an exemplary embodiment of the present invention.

FIG. 8 is a logical flowchart diagram illustrating an alternative exemplary computer-implemented method for host sensors 215 actively blocking packets containing ICMP protocol at the host 120 as completed by step 335 of FIG. 3. Referencing FIGS. 1, 2, and 8, the alternative exemplary method 335a begins with an inquiry to determine if the block rule used to block the packet is valid or expired in step 805. Rules for blocking a packet are typically stored in the packet analysis component 160. If the rule is expired, the "EXPIRED" branch is followed to step 310 of FIG. 3, where an inquiry is conducted to determine if another packet is received at the host 120. If the rule is not expired, the "VALID" branch is followed to step 810.

In step 810, an inquiry is conducted to determine if the intruder's IP address should be blocked from the system 100. The determination is typically made by the data correlation component 150, the local data correlation component 270, or based on signature information in the packet header. If the intruder IP address should be blocked, the "YES" branch is followed to step 815, where an instruction to block the intruder's IP address is added to an ICMP block criteria in the packet analysis component 160. The process continues to step 820. If the intruder's IP address should not be blocked, the "NO" branch is followed to step 820. In step 820, an inquiry is conducted to determine if the victim's IP address should be blocked from the system 100. The determination is typically made by the data correlation component 150, the local data correlation component 270, or based on signature information in the packet header. The victim typically includes a host 120. Blocking the host's 120 IP address from the system 100 would isolate the host 120 from the rest of the system 100 or network. If the victim's IP address should be blocked from the system 100, the "YES" branch is followed to step 825, where an instruction containing the victim's IP address is added to the ICMP block criteria. The process continues to step 830. If the victim's IP address should not be blocked, the "NO" branch is followed to step 830.

In step 830, an inquiry is conducted to determine if the packet ICMP code should be blocked from the system 100. The determination is typically made by the data correlation component 150, the local data correlation component 270, or signature information in the packet header. If packet ICMP code should be blocked, the "YES" branch is followed to step 835, where an ICMP code field is added to the ICMP block criteria. The process continues to step 840. If ICMP code should not be blocked, the "NO" branch is followed to step 840. In step 840, an inquiry is conducted to determine if the victim's ICMP type should be blocked from the system 100. If so, the "YES" branch is followed to step 845, where the victim's ICMP type is added to the ICMP block criteria in the packet analysis component 160. The process continues to step 850. If the victim's ICMP type should not be blocked, the "NO" branch is followed to step 850. The determination is typically made by the data correlation component 150, the local data correlation component 270, or signature information in the packet header.

In step 850, an inquiry is conducted to determine if a block percentage for ICMP packets has been met. If the block percentage is reached, or met, then the packet currently being evaluated is blocked from the host 120 and system 100. If the block percentage has been met, the "YES" branch is followed to step 855, where an instruction that the block percentage has been met is added to the ICMP block criteria. The process continues to step 860. If the block percentage has not been met, the "NO" branch is followed to step 860, where the host sensor 215 applies the ICMP block criteria to the received packet. The process continues to step 310 of FIG. 3.

Figure 9:
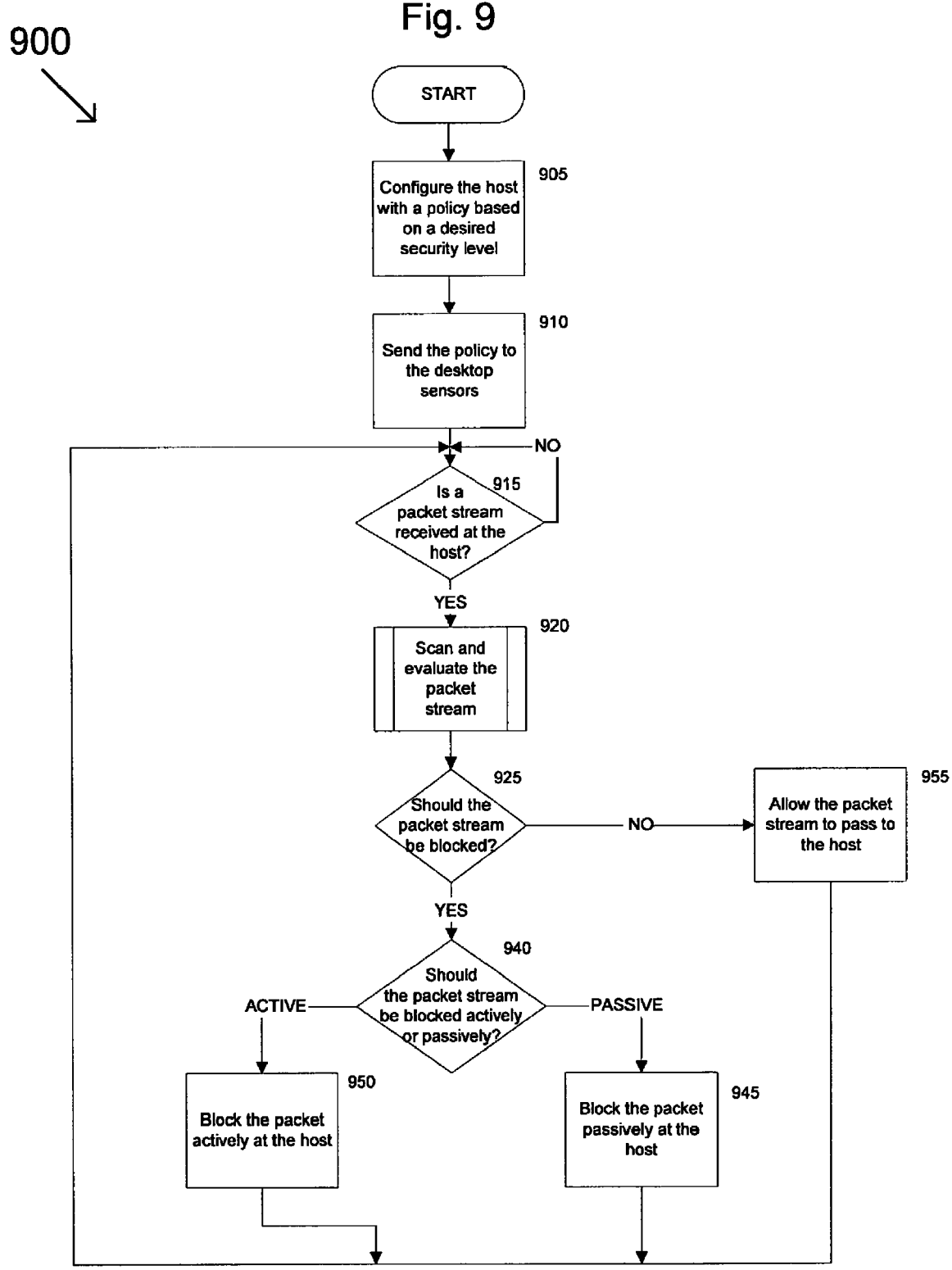
FIG. 9 is a flowchart illustrating a process for dynamically protecting a host in accordance with an exemplary embodiment of the present invention.

FIG. 9 is a logical flowchart diagram 900 presented to illustrate the general steps of an exemplary computer-implemented method for dynamically protecting a host 120 of FIG. 2. Now referring to FIGS. 2 and 9, the exemplary method 900 begins at the START step and proceeds to step 905, in which the host 120 is configured with a policy based on a user's desired security level. Policy configuration is typically determined by the user of the host 120 selecting a risk aversion setting. In one exemplary embodiment four risk aversion settings exist: trusting, cautious, nervous, or paranoid.

When a user selects the "trusting" risk aversion setting the host 120 usually will not block any packet streams received or sent by the host 120. The "cautious" setting blocks unsolicited network traffic attempting to access operating system and networking services. The "cautious" setting is good for regular use on the Internet 110. Selecting the "nervous" setting blocks all unsolicited packets received at the system 100 except for some interactive content on web sites. The nervous setting is preferable if the system 100 is experiencing frequent attacks. Selecting the "paranoid" setting blocks all packet streams received, but allows packets to be sent from the host 120. The "paranoid" setting is often used when a system 100 is undergoing continuous repeated attacks.

In step 910, the policy is sent to the host sensor 215. The policy typically contains the blocking protocol for the host 120. In step 915, an inquiry is conducted to determine if the host 120 receives a packet stream. If not, the "NO" branch is followed to step 915. If the host 120 receives a packet stream, the "YES" branch is followed to step 920. The host 120 typically receives packets from the system 100, the network, and the Internet 110. In step 920, the packet is analyzed by a scanning component 210 and the local data correlation component 270. In step 925 and inquiry is conducted to determine if the packet stream should be blocked at the host 120. If not, the "NO" branch is followed to step 955, where the packet stream is allowed to pass through to the host 120. The process then continues to step 915. However, if the packet should be blocked, the "YES" branch is followed to step 940. In one exemplary embodiment, the inquiry conducted in step 925 is the same as the inquiry conducted in step 315 of FIG. 3.

In step 940, an inquiry is conducted to determine if the packet should be blocked actively or passively. If the packet will be blocked passively, the "PASSIVE" branch is followed to step 945, where the host sensor 215 passively blocks the packet. In one exemplary embodiment, the steps for passively blocking a packet at the host 120 are the same as step 330 of FIG. 3. The process then returns to the step 915. If the packet will be blocked actively, the "ACTIVE" branch is followed to step 950, where the host sensor 220 actively blocks the packet. In one exemplary embodiment, the steps for actively blocking a packet at the host 120 are the same as step 335 of FIG. 3. In another exemplary embodiment, all packets received at the host 120 are actively blocked by the host sensors 215. The process then returns to step 915.

Figure 10:
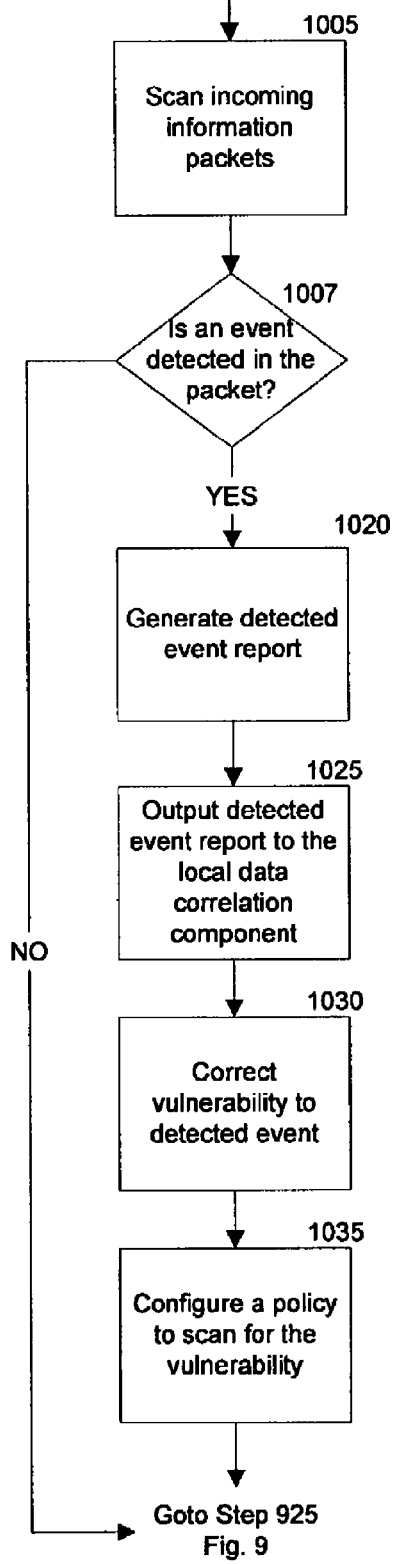
FIG. 10 is a flowchart illustrating a process for evaluating a packet at the host in accordance with an exemplary embodiment of the present invention.

FIG. 10 is a logical flowchart diagram illustrating an exemplary computer-implemented method for scanning a packet stream at the host level as completed by step 920 of FIG. 9. Referencing FIGS. 1, 2, and 9, the exemplary method 920 begins with the scanning component 210 scanning the received packet stream in step 1005. In step 1007, an inquiry is conducted to determine if the scanning component 210 detects an event in the packet. An event includes data within a packet which the host 120 may be vulnerable to if the packet is allowed to pass into the host 120. If an event is not detected, the "NO" branch is followed to step 925 of FIG. 9. If an event is detected, the "YES" branch is followed to step 1020, where the scanning component 210 generates a vulnerability assessment report based on a detected event in the packet, for the host 120. The scanning component 210 sends the vulnerability assessment report to the local data correlation component 270 in step 1025.

In step 1030, the local data correlation component 270 corrects the host's 120 vulnerability to the detected event. By correcting the vulnerability, the host 120 will no longer be vulnerable to the same kind of event. In step 1035, the local data correlation component 270 generates a policy to scan for the detected event. The process continues to step 925 of FIG. 9.

Figure 11:
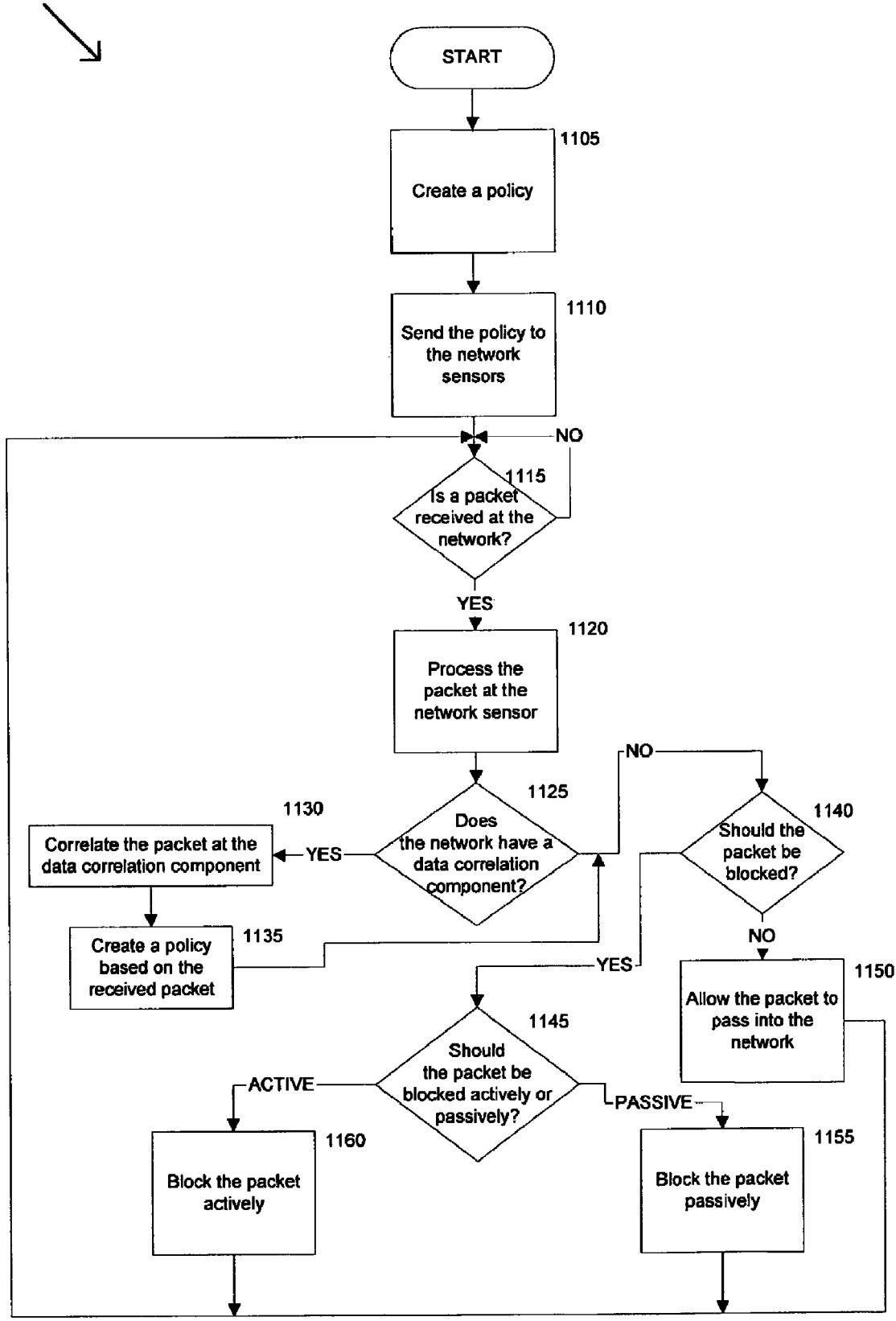
FIG. 11 is a flowchart illustrating a process for dynamically protecting a network in accordance with an exemplary embodiment of the present invention.

FIG. 11 is a logical flowchart diagram 1100 presented to illustrate the general steps of an exemplary computer-implemented method for dynamically protecting a network. Now referring to FIGS. 1 and 11, the exemplary method 1100 begins at the START step and proceeds to step 1105 where a manager program creates a policy for protecting the network. In step 1110, the manager program sends the policy to one or more network sensors 157. In step 1115, an inquiry is conducted to determine if a packet is received by the network. If not, the "NO" branch is followed to step 1115. However, if a packet is received by the network, the "YES" branch is followed to step 1120. In step 1120, the network sensor 157 which received the packet processes it.

In step 1125, an inquiry is conducted to determine if the network contains a data correlation component 150. The data correlation component 150 is an optional component of the network. If the network contains a data correlation component 150, the "YES" branch is followed to step 1130, where the data correlation component 150 correlates the data in the packet. In step 1130, the data correlation component creates an updated policy based on the data correlation component's 150 evaluation of the packet and the vulnerabilities of the network. The process continues to step 1140. If the network does not contain a data correlation component, the "NO" branch is followed to step 1140.

In step 1140, an inquiry is conducted to determine if the packet should be blocked. If not, the "NO" branch is followed to step 1150, where the packet is allowed to pass into the network. The process then returns to step 1115. If the packet should be blocked, the "YES" branch is followed to step 1145. In one exemplary embodiment the inquiry of step 1140 is the same as the inquiry of step 315 of FIG. 3. In step 1145, an inquiry is conducted to determine if the network sensor 157 should block the packet actively or passively. If the packet should be blocked passively, the "PASSIVE" branch is followed to step 1155, where the network sensor 157 blocks the packet passively from the network. The process then returns to step 1115. In one exemplary embodiment, the steps for passively blocking a packet at the host 120 are the same as step 330 of FIG. 3. On the other hand, if the packet should be blocked actively, the "ACTIVE" branch is followed to step 1160, where the network sensor 157 blocks the packet actively from the network. The process then returns to step 1115. In one exemplary embodiment, the steps for actively blocking a packet at the host 120 are the same as step 335 of FIG. 3.

FIG. 12 is a logical flowchart diagram 1200 illustrating an exemplary computer-implemented method for updating a protection policy for a system 100, network or host 120. Now referring to FIGS. 1, 2, and 12, the exemplary method 1200 begins at the START step and proceeds to step 1205, where an inquiry is conducted to determine if the system 100, network, or host 120 receives a new policy at the packet analysis component 160. The data correlation component 150 searches for protection policies on the server 100, network, or host 120. If no protection policies are found to deal with the attack, a new security policy is deployed from a central management environment to the packet analysis component 160. The new policy does not replace any previous protection policy in the host 120, but instead, provides at least one new program to assist in blocking attacks. The new protection policy self-installs in the host 120. The new protection policy ensures that the protection system is up-to-date on the latest threats and security developments. Furthermore, by providing additional protection policies instead of modifying prior protection policies, the system 100 does not require downtime. Thus, a system administrator can delay initiating a complete protection system upgrade until system 100 downtime will be less detrimental to enterprise performance. In one exemplary embodiment, the new policy is sent to the packet analysis component 160 via the Internet 110 from a third-party. If a new policy is not received, the "NO" branch is followed to step 1205, where the inquiry is conducted again. If a new policy is received, the "YES" branch is followed to step 1210.

In step 1210, the packet analysis component 160 delivers the new policy to the host 120. In step 1215, the host 120 parses the new policy. Parsing allows the host 120 to separate the multiple programs which may be contained in the new policy. In step 1220, the new protection policy added to the host 120, is reconfigured by the local data correlation component 270 based on the risk aversion setting at the host 120. In one exemplary embodiment, the policy configured at the host 120 includes the new policy, as well as previous policies received by the host 120. The host 120 sends the reconfigured policy to the host sensors 215 in step 1225. The process returns to step 1205 to determine if another new policy has been received by the packet analysis component.

In conclusion, the present invention supports a computer-implemented method and system for determining if a system, network, or host is vulnerable to a particular type of attack from data received from an outside source. If the system, network, or host is vulnerable, the present invention can determine one or more methods for blocking the data packet from passing into the system, network, or host determined to be vulnerable, while allowing the data packet to pass into the system, network, or host which is not vulnerable. Furthermore, the present invention supports correlating suspicious data packets received by a computer system against hosts with may be vulnerable to a particular type of attack to support the blocking of data packets for the vulnerable hosts. Additionally, the present invention supports a method an system for updating policies used by the system, network, or host to support the blocking of data packets from the vulnerable hosts.

It will be appreciated that the present invention fulfills the needs of the prior art described herein and meets the above-stated objectives. While there have been shown and described several exemplary embodiments of the present invention, it will be evident to those skilled in the art that various modifications and changes may be made thereto without departing from the spirit and the scope of the present invention as set forth in the appended claims and equivalence thereof.

We claim:

1. A computer-implemented method for dynamically protecting a computer system comprising the steps of:
   generating a policy for defending the system from an attack;
   receiving a data packet at the system;
   comparing information in the data packet to the policy to determine if an intrusion event has been detected;
   determining if the data packet should be blocked from entering the system based on the policy for defending the system;
   determining a method of blocking the data packet based on a positive determination to block the data packet from entering the system; and
   blocking the packet from entering the system using the determined method.

2. The computer-implemented method of claim 1 further comprising the step of passing the data packet to the system based on a negative determination to block the data packet from entering the system.

3. The computer-implemented method of claim 1, wherein the step of generating the policy for defending the system from attack comprises:
   evaluating the system for vulnerabilities to a plurality of known attacks;
   generating a vulnerability assessment report based on the evaluation of the system;
   analyzing a plurality of hosts for the system to determine the vulnerability of the plurality of hosts to the attacks based on the vulnerability assessment report;
   determining if at least one of the plurality of hosts are vulnerable to one of the attacks based on the analysis of the vulnerability assessment report;
   generating the policy to protect the system and the plurality of hosts from attacks associated with the plurality of vulnerabilities in the vulnerability assessment report based on a positive determination that at least one host is vulnerable to one of the attacks; and
   sending the policy to a plurality of sensors.

4. The computer-implemented method of claim 3, wherein the step of analyzing a plurality of hosts comprises correlating information in the vulnerability assessment report to prioritize actions to be taken in dynamically protecting the system.

5. The computer-implemented method of claim 3, wherein the plurality of sensors comprise host sensors and network sensors.

6. The computer-implemented method of claim 1, wherein the step of determining if the data packet should be blocked from entering the system comprises the steps of:
   evaluating the data packet to determine if the data packet comprises characteristics which make the data packet suspicious, said characteristics comprising characteristics of known attacks; and
   determining whether to block the data packet based solely on a determination that the data packet contains at least one of the characteristics which make the data packet suspicious.

7. The computer-implemented method of claim 6 further comprising the steps of:
   retrieving a protocol from the data packet based on a negative determination to block the data packet; and
   determining a protocol type from the protocol in the data packet.

8. The computer-implemented method of claim 6 further comprising the step of blocking the data packet based on a positive determination that the data packet contains at least one of the characteristics which make the data packet suspicious.

9. The computer-implemented method of claim 1 wherein the method of blocking the data packet comprises at least one active method and a passive method.

10. The computer-implemented method of claim 9, wherein the passive method of blocking a data packet comprises the steps of:
    determining if the system will send a reset packet to a party who sent the data packet; and
    if so, sending the reset packet to the party who sent the data packet, the reset packet operative to communicate to the party that the system has disconnected from the party.

11. The computer-implemented method of claim 10 further comprising the steps of:
    determining if the system will reset at least one of a plurality of hosts that is vulnerable to the attack by the data packet;
    retrieving at least one identification code from the at least one host based on a positive determination that the at least one host is vulnerable to the attack;
    identifying each of the hosts to be reset based on each identification code; and
    sending the reset packet to each of the identified hosts.

12. The computer-implemented method of claim 11 further comprising the step of allowing the data packet to enter the system in response to sending the reset packet to each of the identified hosts.

13. The computer-implemented method of claim 9 wherein a first active method of blocking a data packet from the system comprises:
    determining if a rule for blocking the packet is no longer valid because the time limit for the rule is expired;
    determining if a network address for a party sending the data packet should be blocked from the system if the rule for blocking the packet is valid;
    inserting into a blocking criteria an instruction to block the network address for the party sending the data packet based on a positive determination to block the network address; and
    applying the blocking criteria to the data packet.

14. The computer-implemented method of claim 13 further comprising the steps of:
    determining if the port of the party sending the data packet should be blocked from the system; and
    inserting into the blocking criteria an instruction blocking the port belonging to the party sending the data packet based on a positive determination to block the port.

15. The computer-implemented method of claim 13 further comprising the steps of:
    determining if at least one of a plurality of host network addresses should be blocked from the system; and
    inserting into the block criteria an instruction blocking at least one host network address based on a positive determination to block host network addresses.

16. The computer-implemented method of claim 13 further comprising the steps of:
    determining if at least one of a plurality of host ports should be blocked from the system; and
    inserting an instruction into the block criteria blocking at least one host port based on a positive determination to block host ports.

17. The computer-implemented method of claim 13 further comprising the steps of:
    determining if a block percentage has been met on the system, whereby the block percentage is a numerical value corresponding to the number of data packets blocked as compared to the total number of data packets received by the system; and
    inserting an instruction into block criteria blocking the data packet meeting the block percentage based on a positive determination that the block percentage has been met.

18. The computer-implemented method of claim 13, wherein the first active method of blocking a data packet is initiated on each data packet comprising transmission control protocol and user datagram protocol.

19. The computer-implemented method of claim 13 further comprising the steps of:
    determining if a packet internet control message protocol ("ICMP") code should be blocked from the system; and
    inserting an instruction into the block criteria blocking the packet internet control message protocol code from the system based on a positive determination to block packet internet control message protocol code.

20. The computer-implemented method of claim 13 further comprising the steps of:
    determining if at least one of a plurality of host internet control message protocol types should be blocked from the system; and
    inserting an instruction into the block criteria blocking at least one host internet control message protocol type based on a positive determination to block host internet control message protocol types.

21. The computer-implemented method of claim 13, wherein a second active method of blocking a data packet is initiated on each data packet comprising internet control message protocol.

22. The computer-implemented method of claim 1, wherein the data packet comprises a stream of data being sent from a first point to a second point.

23. A computer-readable tangible storage device having computer-executable instructions for performing the steps recited in claim 1.

24. A computer-implemented method for dynamically protecting a host from attacks comprising the steps of:
receiving a policy for defending the host from attack;
sending the policy to at least one of a plurality of host sensors associated with the host;
receiving a data packet at one of the host sensors;
scanning the data packet to determine if the data packet contains at least one suspicious event;
determining if the data packet should be blocked from passage to the host based on the received policy in response to detection of at least one suspicious event;
selecting a method of blocking the data packet from a set of block criteria based on a positive determination to block the data packet from entering the host;
blocking the packet from entering the host using the selected method;
determining if a block percentage has been met on the system, whereby the block percentage is a numerical value corresponding to the number of data packets blocked as compared to the total number of data packets received by the system; and
inserting an instruction into the block criteria blocking the data packet meeting the block percentage based on a positive determination that the block percentage has been met.

25. The computer-implemented method of claim 24 wherein the method of blocking the data packet comprises at least one active method and a passive method.

26. The computer-implemented method of claim 25, wherein the passive method of blocking a data packet from the system comprises the steps of:
determining if the system will send a reset packet to a party who sent the data packet; and
sending the reset packet to the party who sent the data packet, the reset packet operative to communicate to the party that the system has disconnected from the party.

27. The computer-implemented method of claim 26 further comprising the steps of:
determining if the system will reset at least one of a plurality of hosts that is vulnerable to the attack by the data packet;
retrieving at least one identification code from the at least one host based on a positive determination that the at least one host is vulnerable to the attack;
identifying each of the hosts to be reset based on the identification codes; and
sending the reset packet to each of the identified hosts.

28. The computer-implemented method of claim 27 further comprising the step of allowing the data packet to enter the system in response to sending the reset packet to each of the identified hosts.

29. The computer-implemented method of claim 25 wherein a first active method of blocking a data packet from the host comprises:
determining if a rule for blocking the packet is no longer valid because the time limit for the rule is expired;
determining if a network address for a party sending the data packet should be blocked from the system if the rule for blocking the packet is valid;
inserting into a blocking criteria an instruction to block the network address for the party sending the data packet based on a positive determination to block the network address; and
applying the blocking criteria to the data packet.

30. The computer-implemented method of claim 29 further comprising the steps of:
determining if the port of the party sending the data packet should be blocked from the system; and
inserting an instruction into the blocking criteria blocking the port belonging to the party sending the data packet based on a positive determination to block the port.

31. The computer-implemented method of claim 29 further comprising the steps of:
determining if at least one of a plurality of host network addresses should be blocked from the system; and
inserting an instruction into the block criteria blocking at least one host network address based on a positive determination to block host internet addresses.

32. The computer-implemented method of claim 29 further comprising the steps of:
determining if at least one of a plurality of host ports should be blocked from the system; and
inserting an instruction into the block criteria blocking at least one host port based on a positive determination to block host ports.

33. The computer-implemented method of claim 29, wherein the first active method of blocking a data packet is initiated on each data packet comprising transmission control protocol and user datagram protocol.

34. The computer-implemented method of claim 29 further comprising the steps of:
determining if a packet internet control message protocol ("ICMP") code should be blocked from the system; and
inserting an instruction into the block criteria blocking the packet internet control message protocol code from the system based on a positive determination to block packet internet control message protocol code.

35. The computer-implemented method of claim 29 further comprising the steps of:
determining if at least one of a plurality of host internet control message protocol types should be blocked from the system; and
inserting an instruction into the block criteria blocking at least one host internet control message protocol type based on a positive determination to block host internet control message protocol types.

36. The computer-implemented method of claim 29, wherein a second active method of blocking a data packet is initiated on each data packet comprising internet control message protocol.

37. The computer-implemented method of claim 24, wherein the step of scanning the data packet to determine if the data packet contains at least one suspicious event comprises the steps of:
scanning the data packet;
determining if the data packet contains at least one suspicious event which makes the host vulnerable to an attack by the data packet;
generating a report based on the positive determination that the data packet contains at least one suspicious event;
eliminating the host's vulnerability to the attack by the data packet by correlating information in the generated report; and
generating a policy to scan the host for vulnerability to this attack in the future.

38. The computer-implemented method of claim 37 further comprising the steps of:

determining if a new policy is received by the host;
parsing the new policy based on a positive determination that a new policy was received by the host;
receiving at least one of a plurality of algorithms at the host from the parsed new policy; and
sending the algorithms to at least one of the plurality of host sensors.

39. A computer-readable tangible storage device having computer-executable instructions for performing the steps recited in claim 24.

40. A computer-implemented method for dynamically protecting a computer network from attacks comprising the steps of:
generating a policy for defending the network from attack;
sending the generated policy to at least one of a plurality of network sensors;
receiving a data packet by at least one network sensor;
comparing information in the data packet to the policy to determine if an intrusion event has been detected;
processing the data packet by at least one network sensor to determining if the data packet should be blocked from entering the network based on the policy;
selecting a method of blocking the data packet based on a positive determination to block the data packet from entering the network; and
blocking the packet from entering the network using the selected method.

41. The computer-implemented method of claim 40 further comprising the steps of:
determining if the network contains a data correlation component; and
analyzing the data packet by correlating information in the data packet at the data correlation component.

42. The computer-implemented method of claim 41 further comprising the step of generating a new policy for protecting the network from attack based on the analysis by the data correlation component.

43. The computer-implemented method of claim 40 further comprising the step of passing the data packet to the network based on a negative determination to block the data packet from the network.

44. The computer-implemented method of claim 40, wherein the method of blocking the data packet comprises at least one active method and a passive method.

45. The computer-implemented method of claim 44, wherein the passive method of blocking a data packet from the network comprises the steps of:
determining if the network will send a reset packet to a party who sent the data packet; and
sending the reset packet to the party who sent the data packet, the reset packet operative to communicate to the party that the network has disconnected from the party.

46. The computer-implemented method of claim 45 further comprising the steps of:
determining if the network will reset at least one of a plurality of hosts that is vulnerable to the attack by the data packet;
retrieving at least one identification code from the at least one host based on a positive determination that the at least one host is vulnerable to the attack;
identifying each of the hosts to be reset based on the identification codes; and
sending the reset packet to each of the identified hosts.

47. The computer-implemented method of claim 46 further comprising the step of allowing the data packet to enter the network in response to sending the reset packet to each of the identified hosts.

48. The computer-implemented method of claim 44, wherein a first active method of blocking a data packet from the network comprises:
determining if a rule for blocking the packet is no longer valid because the time limit for the rule is expired;
determining if a network address for a party sending the data packet should be blocked from the network if the rule for blocking the packet is valid;
inserting an instruction into a blocking criteria to block the network address for the party sending the data packet based on a positive determination to block the network address; and
applying the blocking criteria to the data packet.

49. The computer-implemented method of claim 48 further comprising the steps of:
determining if the port of the party sending the data packet should be blocked from the network; and
inserting an instruction into the blocking criteria blocking the port belonging to the party sending the data packet based on a positive determination to block the port.

50. The computer-implemented method of claim 48 further comprising the steps of:
determining if at least one of a plurality of host network addresses should be blocked from the network; and
inserting an instruction into the block criteria blocking at least one host network address based on a positive determination to block host network addresses.

51. The computer-implemented method of claim 48 further comprising the steps of:
determining if at least one of a plurality of host ports should be blocked from the network; and
inserting an instruction into the block criteria blocking at least one host port based on a positive determination to block host ports.

52. The computer-implemented method of claim 48 further comprising the steps of:
determining if a block percentage has been met on the network, whereby the block percentage is a numerical value corresponding to the number of data packets blocked as compared to the total number of data packets received by the network; and
inserting an instruction into block criteria to block the data packet meeting the block percentage based on a positive determination that the block percentage has been met.

53. The computer-implemented method of claim 48, wherein the first active method of blocking a data packet is initiated on each data packet comprising transmission control protocol and user datagram protocol.

54. The computer-implemented method of claim 48 further comprising the steps of:
determining if a packet internet control message protocol ("ICMP") code should be blocked from the network; and
inserting an instruction into the block criteria blocking the packet internet control message protocol code from the network based on a positive determination to block packet Internet control message protocol code.

55. The computer-implemented method of claim 48 further comprising the steps of:
determining if at least one of a plurality of host internet control message protocol types should be blocked from the network; and inserting an instruction into the block criteria blocking at least one host internet control message protocol type based on a positive determination to block host internet control message protocol types.

56. The computer-implemented method of claim 44, wherein a second active method of blocking a data packet is initiated on each data packet comprising Internet control message protocol.

57. A computer-readable tangible storage device medium having computer-executable instructions for performing the steps recited in claim 40.

58. A computer-implemented method for updating a protection policy for a computer system comprising the steps of:

receiving from a central source a new policy to update protection of the computer system from attacks;

parsing the new policy to retrieve at least one new protection program for protecting the computer system against a previously unknown attack;

sending the new protection program to at least one of a plurality of sensors for the computer system; and installing the new protection program to operate in addition to each existing protection program.

\* \* \* \* \*